US011545130B1

(12) United States Patent
Curd et al.

(10) Patent No.: US 11,545,130 B1
(45) Date of Patent: Jan. 3, 2023

(54) SYSTEM AND METHOD FOR AN AUDIO REPRODUCTION DEVICE

(71) Applicant: SCAEVA TECHNOLOGIES, INC., Gilroy, CA (US)

(72) Inventors: Steven Elliott Curd, Gilroy, CA (US); Roustam Asimov, Minsk (BY)

(73) Assignee: Scaeva Technologies, Inc., Gilroy, CA (US)

( * ) Notice: Subject to any disclaimer, the term of this patent is extended or adjusted under 35 U.S.C. 154(b) by 0 days.

(21) Appl. No.: 17/481,936

(22) Filed: Sep. 22, 2021

Related U.S. Application Data

(63) Continuation-in-part of application No. 16/927,792, filed on Jul. 13, 2020.

(60) Provisional application No. 62/873,803, filed on Jul. 12, 2019.

(51) Int. Cl.

| | |
|---|---|
| ***H04R 3/12*** | (2006.01) |
| ***H04R 3/04*** | (2006.01) |
| ***G06F 3/16*** | (2006.01) |
| ***G10K 15/12*** | (2006.01) |
| ***H04S 7/00*** | (2006.01) |
| ***H04S 5/02*** | (2006.01) |

(52) U.S. Cl.
CPC ................ *G10K 15/12* (2013.01); *H04S 5/02* (2013.01); *H04S 7/306* (2013.01); *H04S 2400/05* (2013.01); *H04S 2400/11* (2013.01)

(58) Field of Classification Search
CPC ........ H04S 5/02; H04S 7/306; H04S 2400/05; H04S 2400/11; G10K 15/12; G10K 15/08; G10H 1/0091; G06F 3/162; G06F 3/165
USPC ....... 381/1, 17, 18, 19, 303, 309, 26, 74, 63
See application file for complete search history.

(56) References Cited

U.S. PATENT DOCUMENTS

| | | | | |
|---|---|---|---|---|
| 6,091,012 A * | 7/2000 | Takahashi | G10H 1/0091 84/626 |
| 9,899,013 B1 * | 2/2018 | Stillman | G10H 1/02 |
| 2008/0137875 A1 * | 6/2008 | Zong | G10K 15/12 381/63 |
| 2013/0243211 A1 * | 9/2013 | Kondo | H04S 7/302 381/63 |

* cited by examiner

*Primary Examiner* — Xu Mei
(74) *Attorney, Agent, or Firm* — Minisandram Law Firm; Raghunath S. Minisandram

(57) ABSTRACT

System and method for enhancing audio reproduced by an audio reproduction device with a first channel and second channel is described. X samples of audio signals are received and stored in a portion of an input buffer with 2x positions and rest of the x positions are padded with zero for both the channels. Contents of the input buffer are transformed to frequency domain (FD) components. FD components are multiplied with a first filter coefficient to generate FD components with short echo effect and with a second filter coefficient to generate FD components with long echo effect. Then, they are converted to time domain (TD) components with short echo effect and TD components with long echo effect. Selective TD components with short echo effect and long echo effect are combined to generate a convolved first channel output and a convolved second channel output.

14 Claims, 16 Drawing Sheets

FIGURE 7A
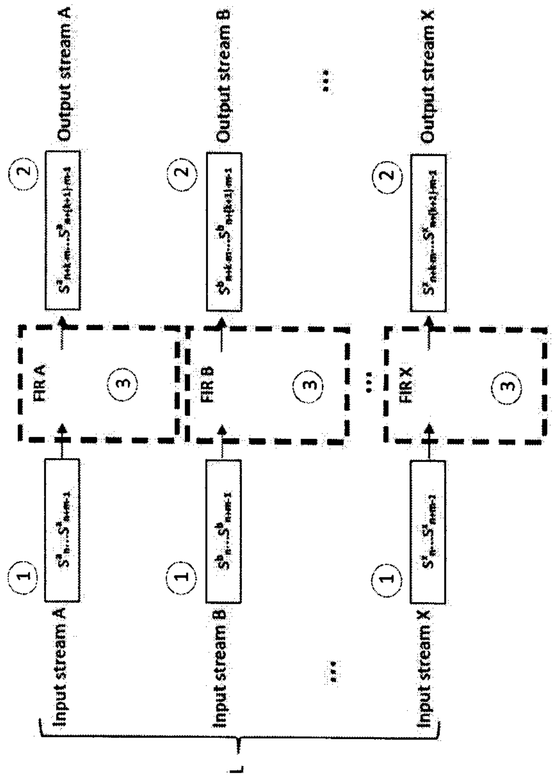
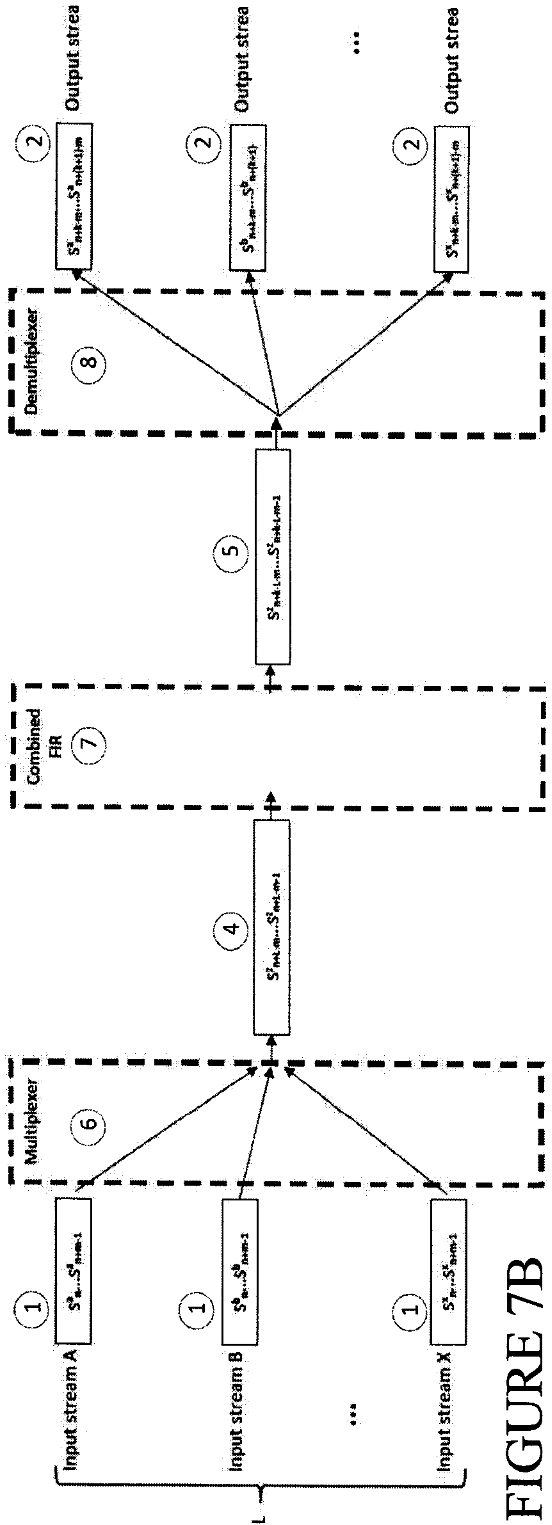
FIGURE 7B

SYSTEM AND METHOD FOR AN AUDIO REPRODUCTION DEVICE

CROSS-REFERENCE TO RELATED APPLICATIONS

This application is a continuation-in-part application of patent application Ser. No. 16/927,792 filed on Jul. 17, 2020, entitled "SYSTEM AND METHOD FOR AN AUDIO REPRODUCTION DEVICE", which claims priority to provisional patent application No. 62/873,803 filed on Jul. 12, 2019, entitled "SYSTEM AND METHOD FOR AN AUDIO REPRODUCTION DEVICE". Contents of application Ser. No. 16/927,792 is incorporated herein by reference, in its entirety. Contents of application No. 62/873,803 is incorporated herein by reference, in its entirety.

TECHNICAL FIELD

The present invention relates generally to an audio reproduction device, and, more particularly, to a head phone.

DESCRIPTION OF RELATED ART

System and method for an audio reproduction device is described. Audio sound reproduction devices may include headphones and earbuds. Humans have evolved to hear sounds within physical spaces. The physical configuration of our two ears, our head between them, and the ways in which we perceive sound is the result of the interface with, and the physical characteristics of, the environment within which sounds are created and transported. However, since the introduction of the Walkman® in 1979, headphones (and later earbuds) became very popular ways to enjoy listening to sound. By closely coupling two sound transducers with our two ears independently, all of environmental effects and the natural perception of sound are circumvented. This creates a synthetic, artificial listening environment, and substantially changes our psychoacoustic interpretation of the sounds that we hear.

Further, entertainment content such as music and film soundtracks are typically created in carefully designed physical environments (studios and sound stages). Therefore, by listening to the resulting music or film soundtracks through headphones, our psychoacoustic experience is typically significantly different than that which was intended by the creators, producers or editors of the content. This presents numerous problems. In some examples, creating content using headphones is highly challenging, therefore requiring carefully designed studio spaces and expensive monitor loudspeakers. In some examples, a listener's psychoacoustic experience while consuming audible content is different when accessed through loudspeakers versus headphones. There is a need to solve one or more of these problems. It is with these needs in mind, this disclosure arises.

SUMMARY OF THE INVENTION

In one embodiment, a method for enhancing audio reproduced by an audio reproduction device is disclosed. X samples of audio signals for at least a first channel and a second channel are received for a given time period, by a digital signal processor. Received x samples of audio signals for the first channel are stored in a first position of an input buffer with 2x positions and rest of the x positions in the first portion are padded with zeroes. Received x samples of audio signals for the second channel are stored in a second position of an input buffer with 2x positions and rest of the x positions in the second portion are padded with zeroes. The contents of the first portion and the second portion are transformed to frequency domain components, by a frequency domain transformation engine. Transformed frequency domain components are multiplied with a first filter coefficients indicative of a short echo, to generate frequency domain components with short echo effect, by a filter coefficient multiplier. Transformed frequency domain components are multiplied with a second filter coefficients indicative of a long echo, to generate frequency domain components with long echo effect, by the filter coefficient multiplier. The frequency domain components with short echo effect are converted to time domain components with short echo effect, by a time domain transformation engine. The frequency domain components with long echo effect are converted to time domain components with long echo effect, by the time domain transformation engine. Selective time domain components with short echo effect and selective time domain components with long echo effect are combined by an overlap adder engine to generate a convolved first channel output and a convolved second channel output.

In another embodiment, a system for enhancing audio reproduced by an audio reproduction device is disclosed. X samples of audio signals for at least a first channel and a second channel are received for a given time period, by a digital signal processor. Received x samples of audio signals for the first channel are stored in a first position of an input buffer with 2x positions and rest of the x positions in the first portion are padded with zeroes. Received x samples of audio signals for the second channel are stored in a second position of an input buffer with 2x positions and rest of the x positions in the second portion are padded with zeroes. The contents of the first portion and the second portion are transformed to frequency domain components, by a frequency domain transformation engine. Transformed frequency domain components are multiplied with a first filter coefficients indicative of a short echo, to generate frequency domain components with short echo effect, by a filter coefficient multiplier. Transformed frequency domain components are multiplied with a second filter coefficients indicative of a long echo, to generate frequency domain components with long echo effect, by the filter coefficient multiplier. The frequency domain components with short echo effect are converted to time domain components with short echo effect, by a time domain transformation engine. The frequency domain components with long echo effect are converted to time domain components with long echo effect, by the time domain transformation engine. Selective time domain components with short echo effect and selective time domain components with long echo effect are combined by an overlap adder engine to generate a convolved first channel output and a convolved second channel output.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIG. 7A shows an example processing of multiple input streams, according to an example of this disclosure;

FIG. 7B shows an alternate example processing of multiple input streams, according to an example of this disclosure;

DETAILED DESCRIPTION

Figure 1:
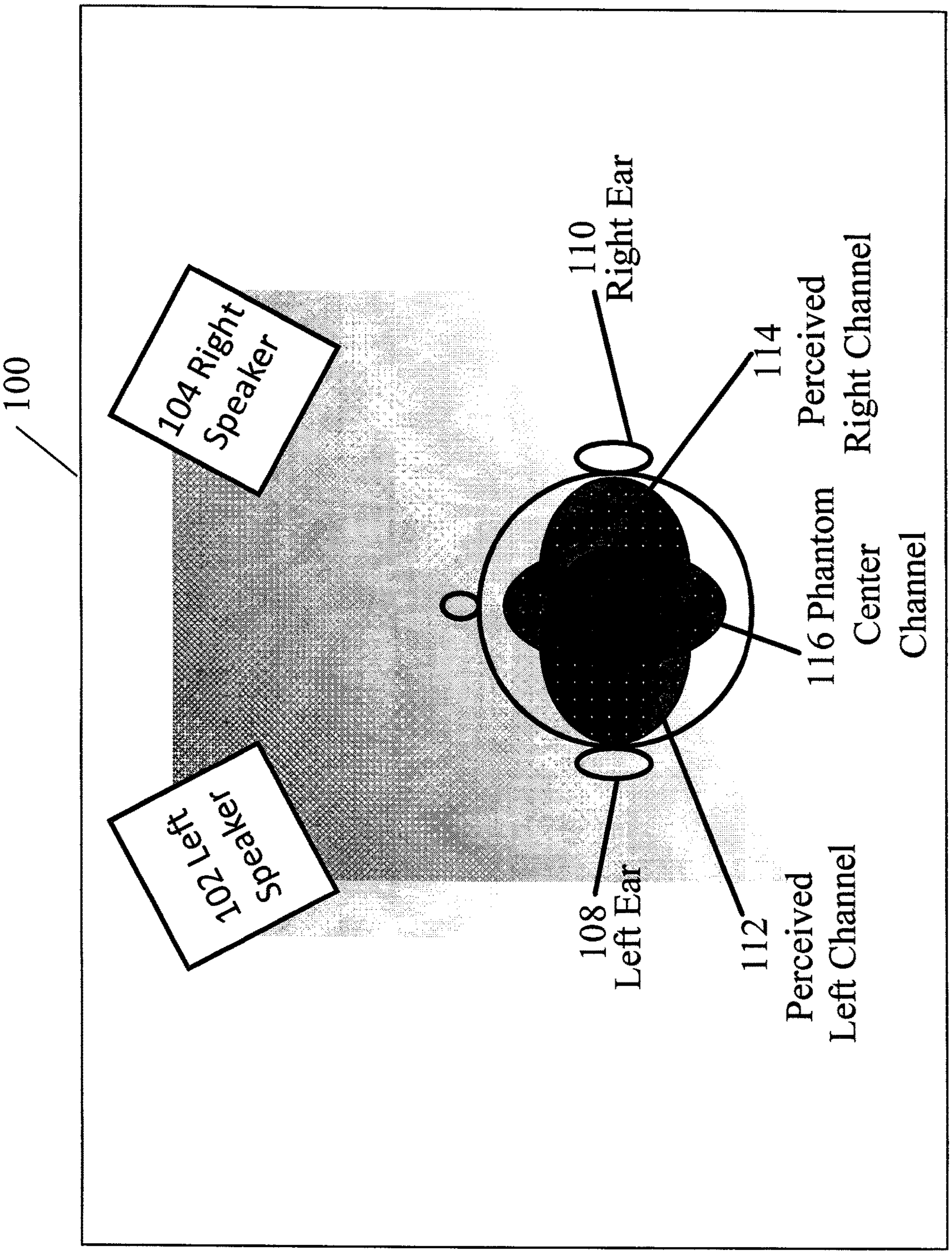
FIG. 1 shows an example listening environment, with left speaker and right speaker, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an audio reproduction device. Referring now to the drawings, where similar reference characters denote corresponding features consistently throughout the figures, various examples of this disclosure is described.

FIG. 1 shows an example listening environment 100 with left speaker 102 and right speaker 104, with a listener 106 selectively positioned to listen to the audio reproduced by the left speaker 102 and right speaker 104, through a combination of left ear 108 and right ear 110 of the listener 106. As one skilled in the art appreciates, the left ear 108 of the listener 106 primarily listens to audio reproduced by left speaker 102 and secondarily listens to the audio reproduced by the right speaker 104. Similarly, the right ear 110 of the listener 106 primarily listens to audio reproduced by right speaker 104 and secondarily listens to the audio reproduced by the left speaker 102. Left channel perceived by the listener 106 is depicted by the left shaded area 112. Right channel perceived by the listener 106 is depicted by the right shaded area 114. As one skilled in the art appreciates, the left shaded area 112 overlaps with the right shaded area 114. Further, a phantom center channel 116 is perceived by the listener 106.

Figure 2:
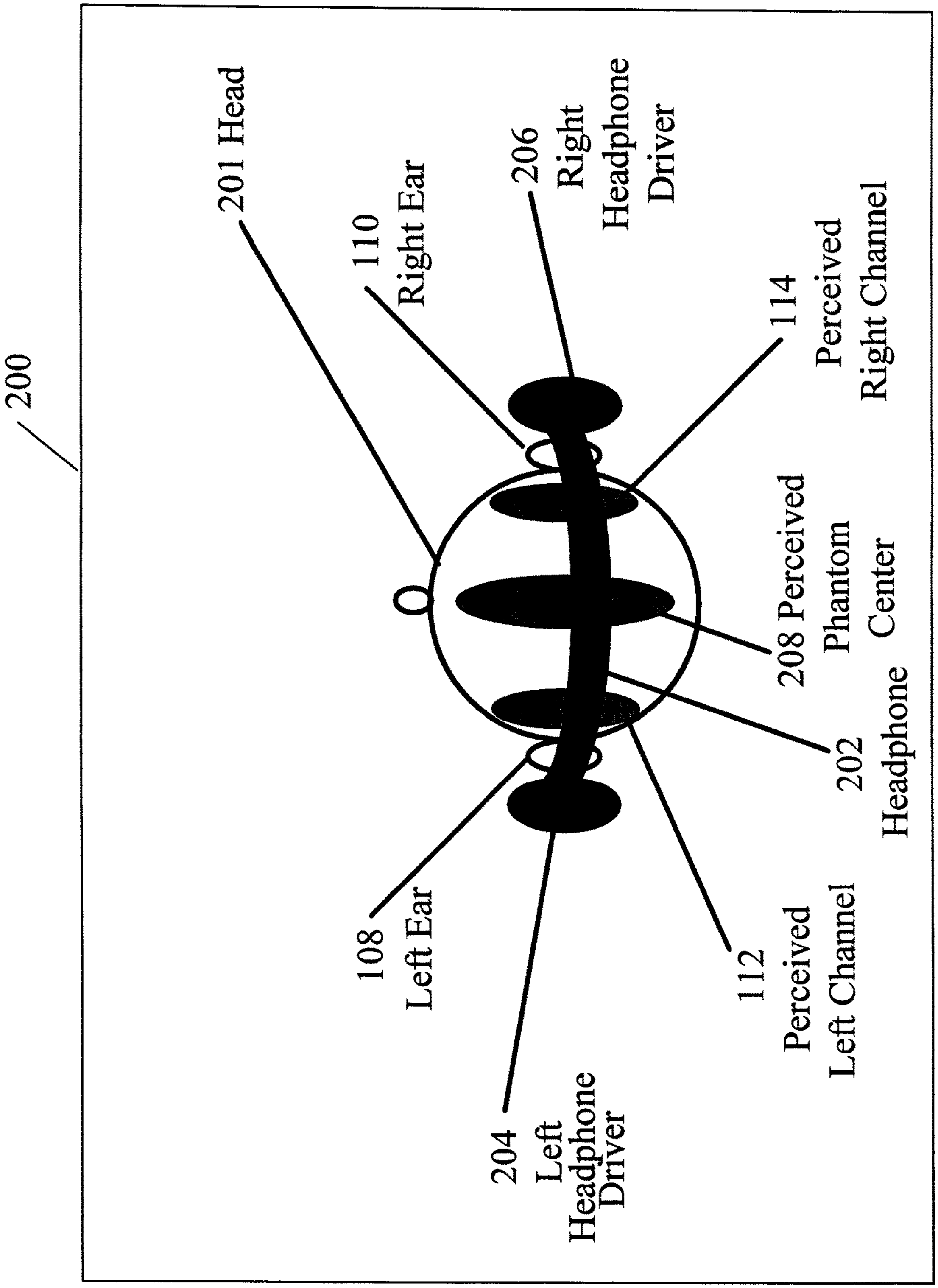
FIG. 2 shows another example listening environment, with left speaker and right speaker, according to an example of this disclosure.

FIG. 2 shows another example listening environment 200. In this listening environment 200, the listener 106 is using a headphone 202, with a left headphone driver 204 placed around, in or near the left ear 108 and a right headphone driver 206 placed around, in or near the right ear 110. The listener 106 selectively listens to the audio reproduced by the left head phone driver 204 through the left ear 108. The listener 106 also listens to the audio reproduced by the right head phone driver 206 through the right ear 110. Left channel perceived by the listener 106 is depicted by the left shaded area 112. Right channel perceived by the listener 106 is depicted by the right shaded area 114. As one skilled in the art appreciates, in this example, the left shaded area 112 does not overlap with the right shaded area 114. Further, a phantom center channel 116 is perceived by the listener 106. In this example, the phantom center channel 116 perceived by the listener 106 is narrower than as perceived in the example listening environment 100 described with reference to FIG. 1. In other words, the listener 106 in listening environment 200 experiences a materially different sound perception as compared to the listening environment 100. The consequences of this modified perception are broad. In some cases, the perceived locations of particular sounds are changed. In other cases, the lack of environmental effects such as indirect sounds resulting from reflective surfaces within a physical room or space are removed.

According to an example of this disclosure, real-time convolution to the digital sound signals are applied, with separate convolution functions for each incoming channel, and for each ear. For example, with a two-channel stereo signal, convolutions will be applied in real-time for the left channel to the left ear sometimes referred to as a LL convolution, left channel to the right ear, sometimes referred to as a LR convolution, right channel to the left ear, sometimes referred to as a RL convolution and right channel to the right ear, sometimes referred to as RR convolution.

In one example, each convolution function applies pre-calculated coefficients, associated with the impulse response data from a specific physical space. The number of coefficients for each convolution set can be calculated as follows: $n=s*t$, where n is the number of coefficients per convolution set, s is the sample rate of the digital signal source in samples per second, and t is the maximum convolution time in seconds. For example, with a signal sample rate of 64,000 samples per second and 0.25 seconds of maximum convolution time, n of 16,000 coefficients are required.

In one example, a non-linear bass distortion (NLBD) function generator is used to digitally generate a controlled harmonic distortion (sometimes referred to as CH distortion) associated with physical subwoofers. The digital NLBD function generator includes a low-pass filter to separate only low frequencies, circuit to generate even and/or odd harmonics, and another low-pass filter. The generated CH distortion is then mixed with the original signal.

In one example, a middle-side filter (MS filter) circuit is used to adjust the physical separation of the original sound source, which may be referred to as the perceived "sound stage". In the case of stereo signal, middle-side filter determines the perceived distance between the right and left virtual speakers within this sound stage. One implementation of a MS filter includes summing the signals from the left and right channels to create a "middle" signal. It also includes calculating the difference between the signals from the left and right channels to create a separate "side" signal. The middle channel then contains just the information that appears in both the left and right channels, and the side channel contains all the information that differs between the left and right channels. In other words, the middle signal represents sounds that would be perceived by a listener to be emanating mainly from a center location. Similarly, the side signal represents sounds that would be perceived by a listener to be emanating from either the left or right sides of the perceived sound stage. Therefore, by independently amplifying or attenuating the middle and side signals, it is possible to emphasize or reduce sound that appear to originate from either the center or the left and right sides of the perceived sound stage. Among other things, this has the effect of determining how far apart the virtual speakers are located within the perceived sound stage. After applying the amplification or attenuation of the middle and side signals, they are then subsequently summed together and divided by 2 to re-create the left signal, and subtracted from each and divided by 2 to recreate the right signal.

Given:

L=left signal

R=right signal

M=middle signal

S=side signal

MG=center gain; >1 represents amplification, 0<MG<1 represents attenuation

SG=side gain; >1 represents amplification, 0<SG<1 represents attenuation

Then:

$$M=MG*(L+R) \quad \text{Equation 1}$$

$$S=SG*(L-R) \quad \text{Equation 2}$$

Finally:

$$\text{Recreated Left Signal } L'=0.5*(M+S) \quad \text{Equation 3}$$

$$\text{Recreated Right Signal } R'=0.5*(M-S) \quad \text{Equation 4}$$

A combination of one or more of the convolution coefficients, CH distortion and MS filter may be applied to the original digital sound. Such a corrected digital sound may assist in recreating the perception of listening to sound as if it were being reproduced by loudspeakers in a defined (modeled) space. For example, the LL, LR, RL and RR convolutions emulate the sounds that would be received by the listener's ears within the modeled space. Instead of perceiving a narrow phantom center channel, the listener's brain reconstructs the processed left and right analog signals reproduced by the left and right headphone drivers into a natural left and right channels, and enables reconstruction of an accurate center channel.

To generate the required convolution coefficients, the desired (modeled) space must be evaluated. Now, referring to FIG. 3A and FIG. 3B desired space 300 is shown, with left speaker 302 and right speaker 304 positioned within the desired space 300.

A left ear microphone 306 and a right ear microphone 308 are selectively placed within the desired space 300, for example, at locations that may substantially correspond to a listener's left ear and right ear respectively.

Figure 3A:
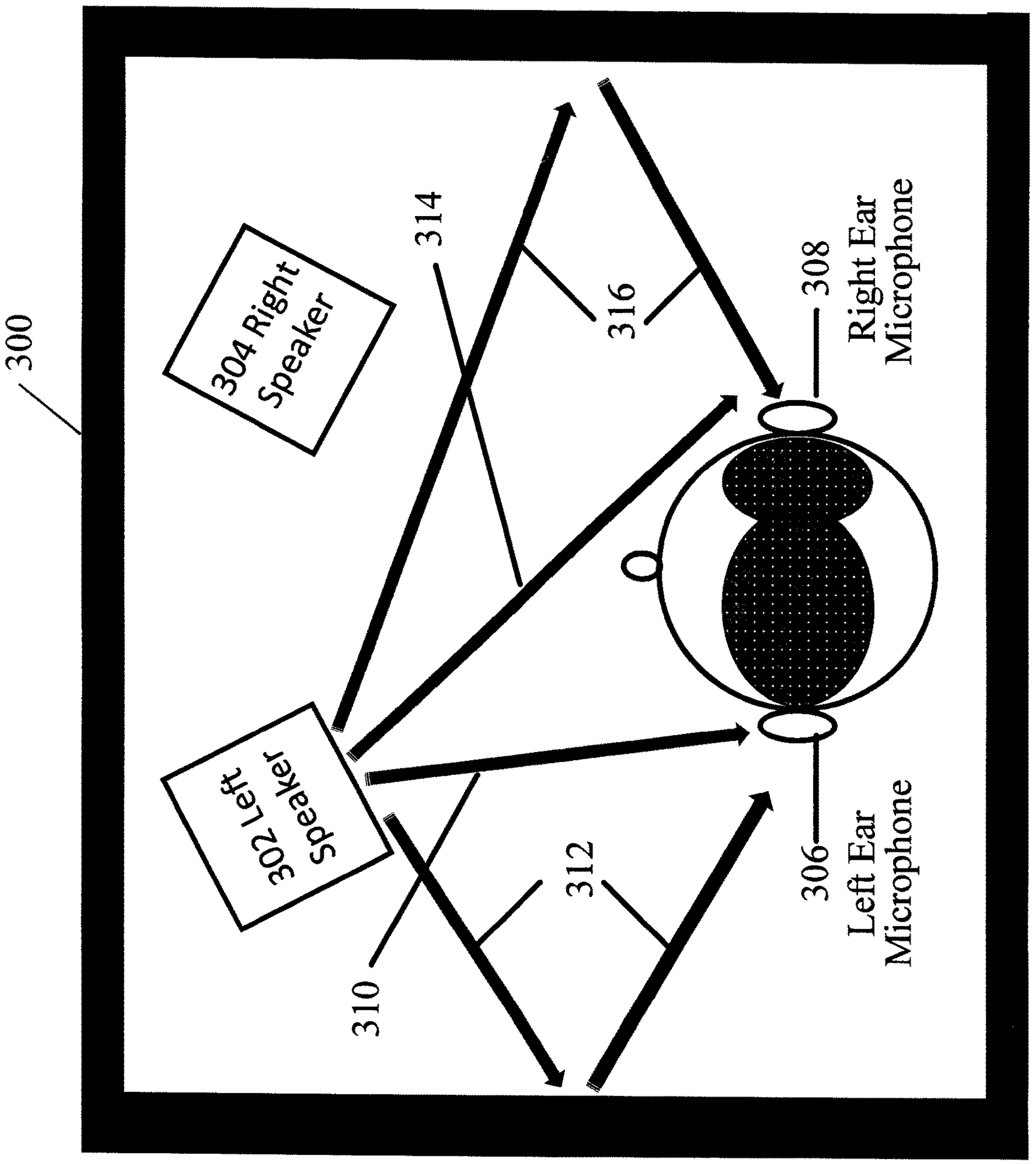
FIGS. 3A and 3B show desired space, with left speaker and right speaker positioned within the desired space, according to an example of this disclosure.

Now, referring to FIG. 3A, left speaker 302 is selectively energized with a known signal. Sound produced by the left speaker 302 is received by both the left ear microphone 306 and the right ear microphone 308. The sound received by the left ear microphone 306 includes a combination of direct signal (as shown by arrow 310) and reflected signals (as shown by arrow 312) off of the acoustically reflective surfaces of the desired space 300. The sound received by the right ear microphone 308 includes a combination of direct signal (as shown by arrow 314) and reflected signals (as shown by arrow 316) off of acoustically reflective surfaces of the desired space 300. As one skilled in the art appreciates, the reflected signal may be from a plurality of reflective surfaces, including walls, ceiling, floor, and other objects located within the desired three-dimensional space 300. Received signal by the left ear microphone 306 and right ear microphone 308 from the left speaker 302 are recorded and deconvolved.

For example, the signal received at the left ear microphone 306 from the left speaker 302 is deconvolved to generate the LL coefficients. The signal received at the right ear microphone 308 from the left speaker 302 is deconvolved to generate the LR coefficients.

Figure 3B:
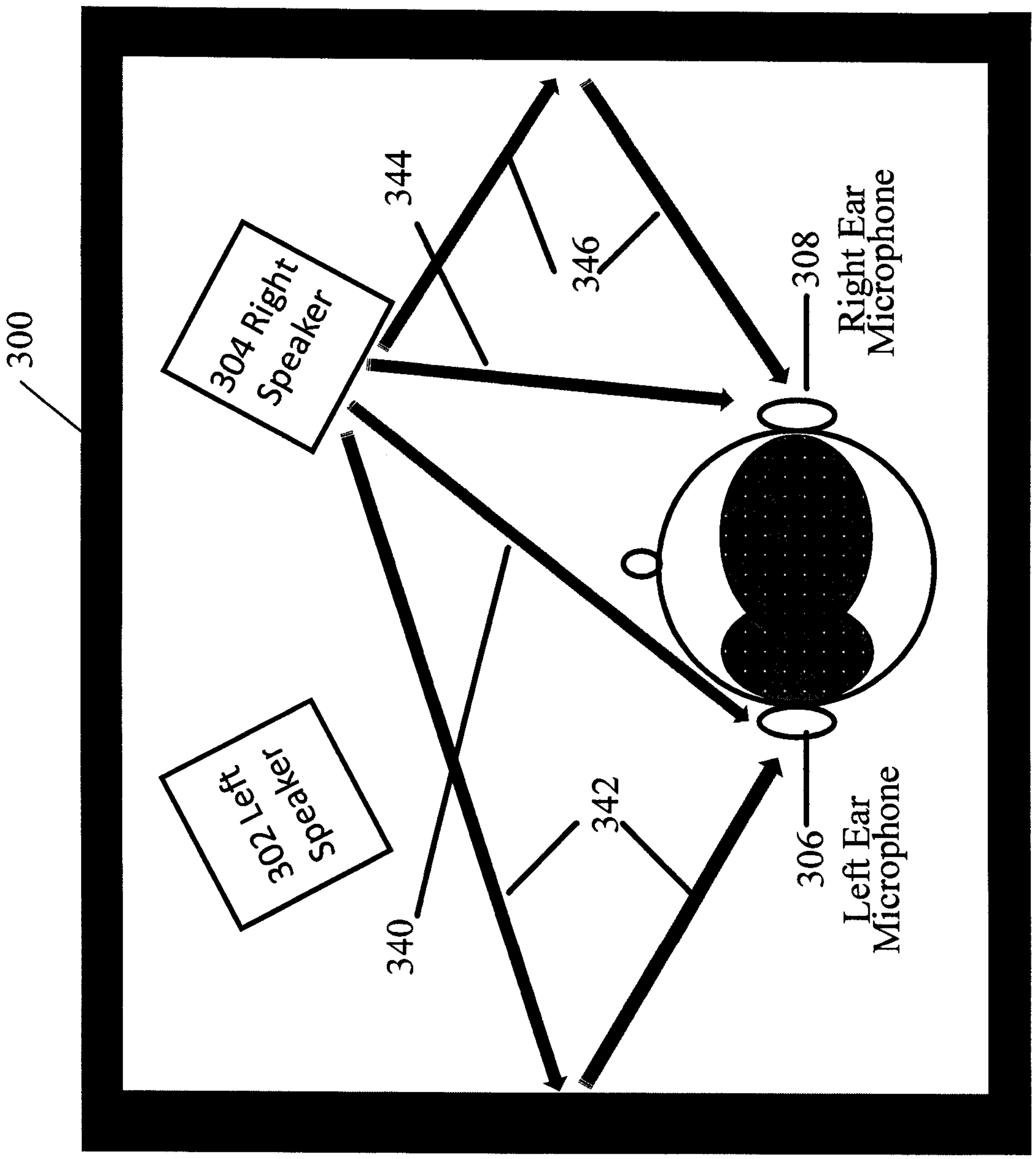
Figure 3C:
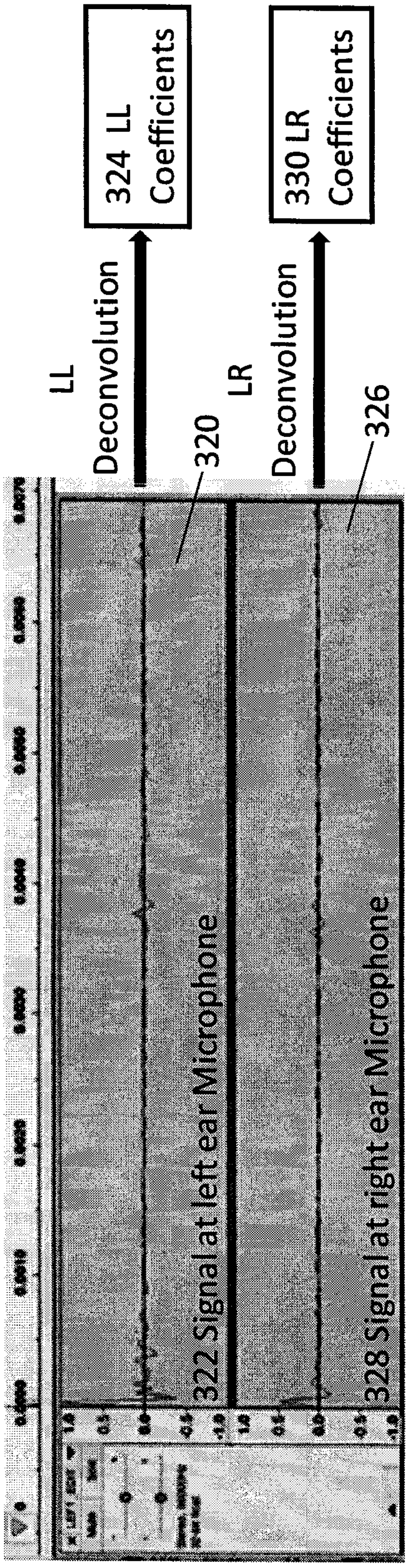
FIG. 3C shows a graph with signal measured at left ear microphone from the sound received from the left speaker and another graph with signal measured at right ear microphone from the sound received from the left speaker 302, according to an example of this disclosure.

Referring to FIG. 3C, graph 320 shows signal 322 measured at left ear microphone 306 from the sound received from the left speaker 302, which is deconvolved to generate LL coefficients 324. And, graph 326 shows signal 328 measured at right ear microphone 308 from the sound received from the left speaker 302, which is deconvoled to generate the LR coefficients 330.

Now, referring to FIG. 3B, right speaker 304 is selectively energized with a known signal. Sound produced by the right speaker 304 is received by both the left ear microphone 306 and the right ear microphone 308. The sound received by the left ear microphone 306 includes a combination of direct signal (as shown by arrow 340) and reflected signal (as shown by arrow 342) off of the acoustically reflective surfaces of the desired space 300. The sound received by the right ear microphone 308 includes a combination of direct signal (as shown by arrow 344) and reflected signal (as shown by arrow 346) off of the acoustically reflective surfaces of the desired space 300. As one skilled in the art appreciates, the reflected signal may be from a plurality of reflective surfaces, including walls, ceiling, floor, and other objects located within the desired space 300. Received signal by the left ear microphone 306 and right ear microphone 308 from the right speaker 304 are recorded and deconvolved.

Figure 3D:
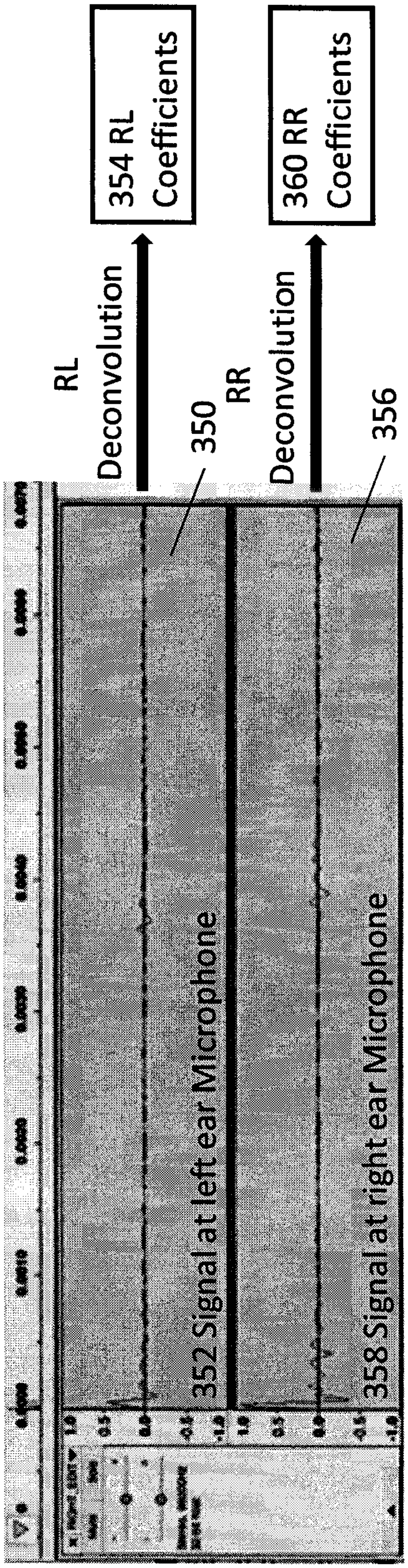
FIG. 3D shows a graph with signal measured at left ear microphone from the right speaker, and another graph with signal measured at right ear microphone from the sound received from the right speaker, according to an example of this disclosure.

For example, the signal received at the left ear microphone 306 from the sound received from the right speaker 304 is deconvolved to generate the RL coefficients. Referring to FIG. 3D, graph 350 shows signal 352 measured at left ear microphone 306 from the right speaker 304 which is deconvolved to generate RL coefficients 354. The signal received at the right ear microphone 308 from the sound received from the right speaker 304 is deconvolved to generate the RR coefficients. And, graph 356 shows signal 358 measured at right ear microphone 308 from the sound received from the right speaker 304, which is deconvoled to generate the RR coefficients 360.

Figure 4:
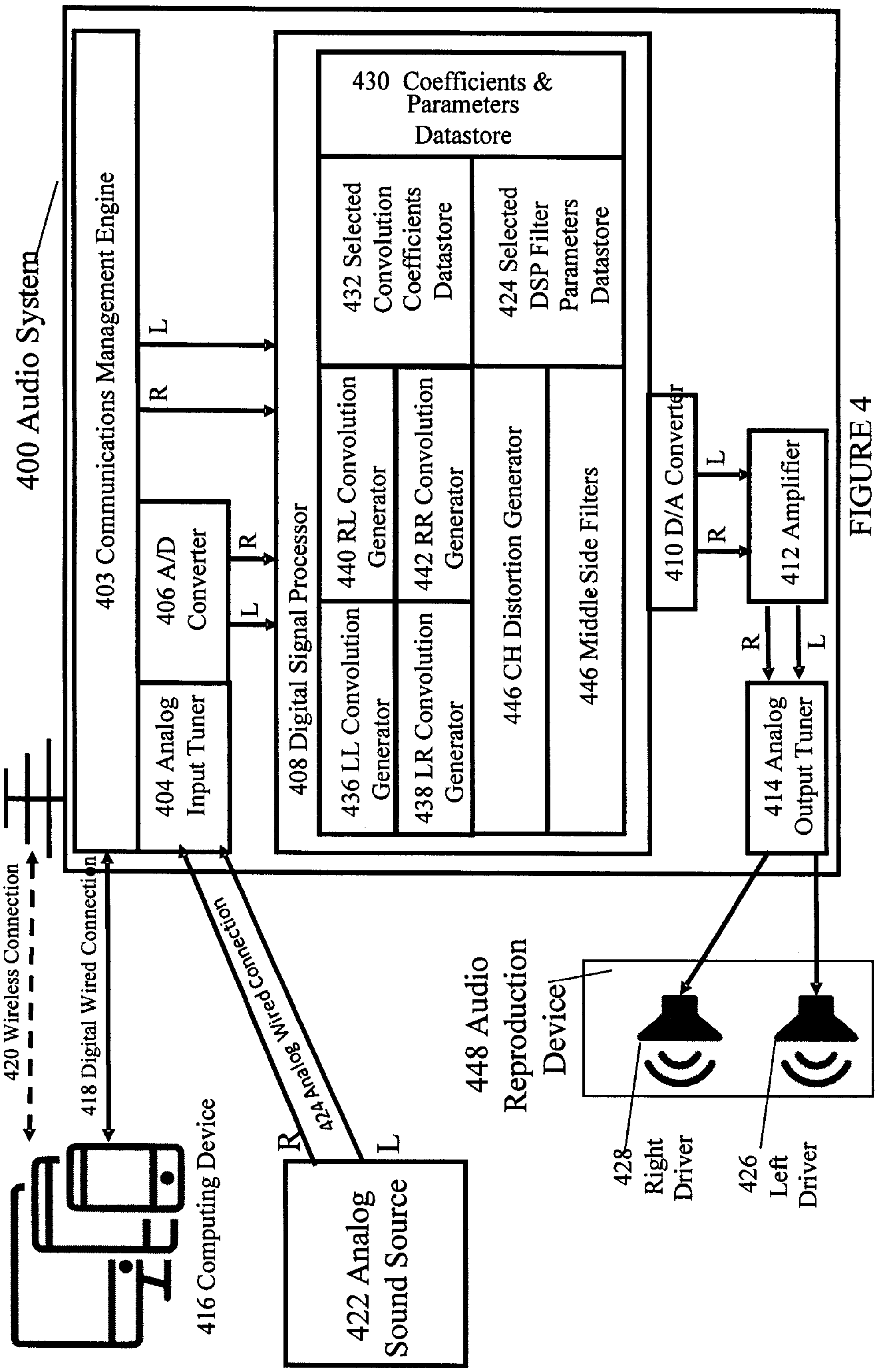
FIG. 4 shows an example audio system, according to an example of this disclosure.

In one example, a digital signal processor may be configured to modify input signal based on the convolution coefficients measured for a modeled space. Now, referring to FIG. 4, an example audio system 400 is described. The audio system 400 includes a communication management engine 402, an analog input tuner 404, A/D (analog to digital) converter 406, a digital signal processor (DSP) 408, a D/A (digital to analog) converter 410, an amplifier 412 and an analog output tuner 414.

The communication management engine 402 is configured to communicate with external devices, for example, computing device 416, over a wired connection 418 or a wireless connection 420. In one example, the communication management engine 402 is configured to communicate with the computing device 416 and receive various parameters for configuring the audio system 400, including the digital signal processor 408. In one example, the communication management engine 402 is configured to receive digital audio signal to be reproduced by the audio system 400, over the wired connection 418 or wireless connection 420. The received digital audio signal (for example, two channel digital audio signals L and R) is fed to the DSP 408.

The analog input tuner 404 is configured to communicate with an analog sound source 422, for example, over an analog wired connection 424, to receive audio signal to be reproduced by the audio system 400. In one example, a two-channel audio signal (left and right) is received. The analog input tuner 404 is configured to optimize impedance and frequency response characteristics of the analog audio signal received from the analog audio source 422. The output of the analog input tuner 404 is fed to the A/D converter 406, to generate digital audio signal (for example, two channel digital audio signals L and R). The digital audio signal is fed to the DSP 408.

The DSP 408 processes the received digital audio signal, applying modifications to the received digital audio signal, based on the convolution coefficients, generated CH distortion and the middle-side filter (MS filter) digital settings. Modified digital audio signal is then fed to the D/A converter 410 to generate modified analog audio signal. The modified analog audio signal in some examples may be amplified by the amplifier 412 to generate an amplified modified analog audio signal. The amplified modified analog audio signal is then fed to an analog output tuner 414. The analog output tuner 414 feeds the amplified modified analog audio signal to left driver 426 and right driver 428, for reproduction of the amplified modified analog audio signal. As one skilled in the art appreciates, if the amplifier 412 is not used, the modified analog audio signal will be fed to the analog output tuner 414 which in turn will feed the modified analog audio signal to the left driver 426 and the right driver 428, for reproduction of the modified analog audio signal. The analog output tuner 414 is configured to optimize impedance and frequency response characteristics of the modified analog audio signal for the left driver 426 and the right driver 428.

Having described the general operation of the audio system 400, functions and features of the DSP 408 will now be described. In general, the DSP 408 is configured to receive digital audio signal (for example, as L and R signals) from the A/D converter 406 (for audio received from an analog audio source) or the communication management engine 402 (for audio received from a digital audio source). The DSP 408 then selectively modifies the received digital audio signal to generate the modified digital audio signal and output the modified digital audio signal, to be fed to the D/A converter 410.

The DSP 408 includes a coefficients and parameters data store 430, a selected convolution coefficients data store 432, a selected DSP filter parameters data store 434, a LL convolution generator 436, a LR convolution generator 438, a RL convolution generator 440, a RR convolution generator 442, a CH distortion generator 444 and a middle-side filter circuit 446. The coefficients and parameters data store 430 stores various coefficients and parameters for one or more modeled space. In one example, various coefficients and parameters are received by the communication management engine 402, from an external computing device and loaded into the coefficients and parameters data store 430.

When a specific modeled space is selected, corresponding coefficients and parameters are retrieved from the coefficients and parameters data store 430 and selectively loaded into the selected convolution coefficients data store 432 and the selected DSP filter parameters data store 434. As one skilled in the art appreciates, the selected convolution coefficients data store 432 and the selected DSP filter parameters data store 434 may be configured to be high speed memory, so that data may be retrieved from them at a speed to process the data in real time.

The LL convolution generator 436, a LR convolution generator 438, a RL convolution generator 440, a RR convolution generator 442 selectively retrieve the selected convolution coefficients from the selected convolution coefficients data store 432 and apply appropriate convolution to each of the channels (L and R) of the digital audio signal to generate a convolved digital audio signal. The convolved digital audio signal is then fed to the D/A converter 410, to generate modified analog audio signal.

In one example, the CH distortion generator 444 adds CH distortion to the convolved digital audio signal. The middle-side filter circuit 446 based on the selected parameters, applies appropriate correction to the convolved digital audio signal with CH distortion, to generate the modified digital audio signal. The modified digital audio signal is then fed to the D/A converter 410, to generate modified analog audio signal.

In one example, the audio system 400 may be selectively placed within an enclosure of an audio reproduction device 448. The audio reproduction device 448 may be a headphone with the left driver 426 and the right driver 428. Additionally, any power source needed to operate the audio system 400 may also be selectively placed within the enclosure of the audio reproduction device 448.

Figure 5:
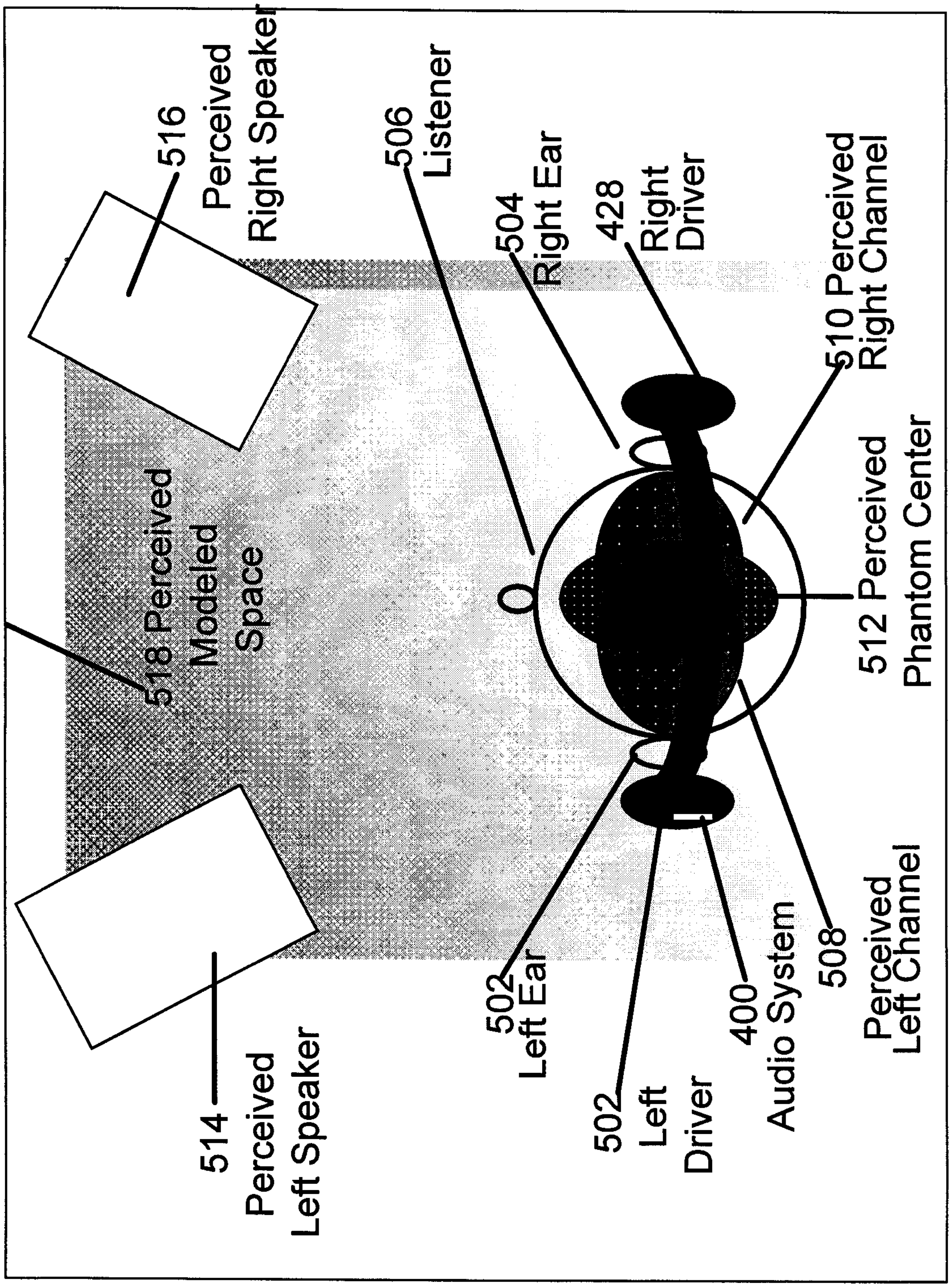
FIG. 5. shows an audio reproduction device placed within the audio system of FIG. 4, according to an example of this disclosure.

Now, referring to FIG. 5, audio reproduction device 448, with left driver 426 and right driver 428 is shown. In this example, the audio system 400 is selectively placed within the audio reproduction device 448, for example, within the enclosure surrounding the left driver 426. The audio reproduction device 448 is selectively placed relative to the left ear 502 and right ear 504 of a listener 506. The modified analog audio signal is reproduced by the left driver 426 and the right driver 428, with an overlapping perceived left channel 508, perceived right channel 510, and a perceived phantom center channel 512. In one example, the listener 506 will have a perception that the sound is emanating from a perceived left loud speaker 514 and perceived right loudspeaker 516, selectively placed within the modeled space 518 from which convolution coefficients were derived.

Figure 6:
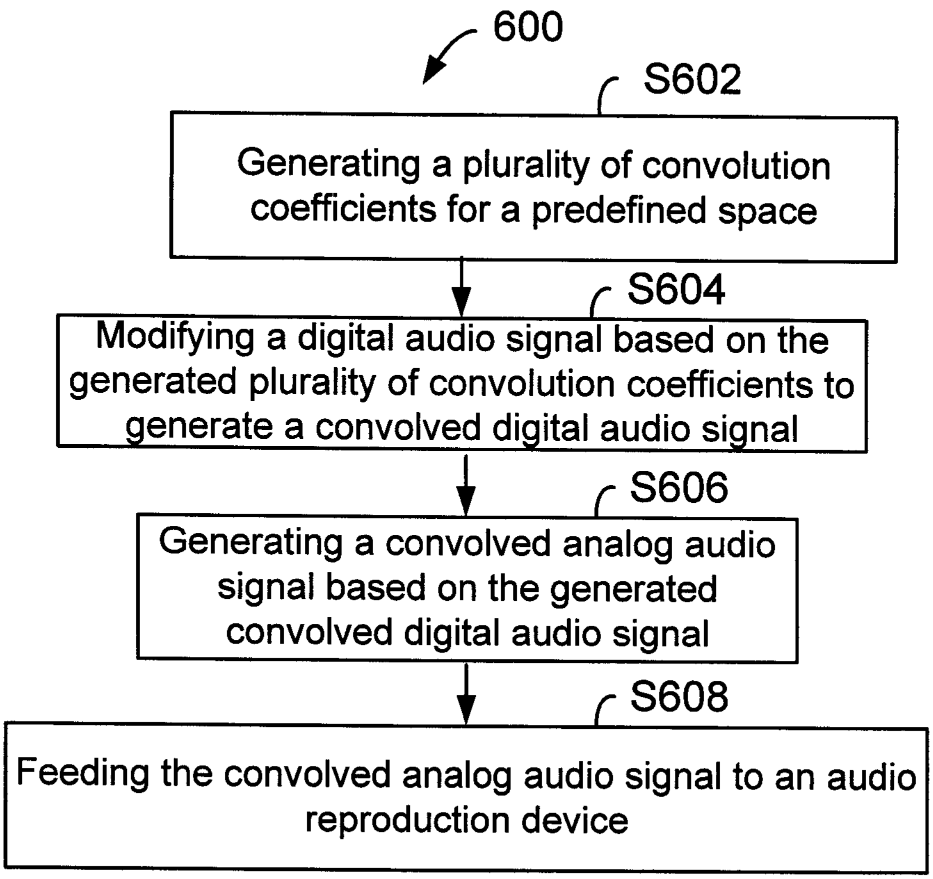
FIG. 6 shows an example flow diagram, according to an example of this disclosure.

Now, referring to FIG. 6, an example flow diagram 600 is described. In block S602, a plurality of convolution coefficients for a predefined space is generated. For example, as previously described, LL convolution coefficient, LR convolution coefficient, RL convolution coefficient and RR convolution coefficient for a predefined space is generated, as previously described.

In block S604, a digital audio signal is modified based on the generated plurality of convolution coefficients, to generate a convolved digital audio signal. For example, as previously described with reference to FIG. 4, an audio system 400 may be configured to modify a digital audio signal, based on the generated plurality of convolution coefficients, to generate a convolved digital audio signal. In some examples, the convolved digital audio signal may be further modified by adding a CH distortion. In some examples, the convolved digital audio signal may be further modified by a middle-side filter circuit, based on selected parameters.

In block S606, a convolved analog audio signal is generated based on the generated convolved digital audio signal. For example, as previously described with reference to FIG. 4, an audio system 400 may be configured to generate the convolved analog audio signal based on the generated convolved digital audio signal. For example, the D/A converter 410 may be conveniently configured to generate the convolved analog audio signal based on the generated convolved digital audio signal. In some examples, the convolved digital audio signal further modified by adding CH distortion and middle-side filter circuit, referred to as modified digital audio signal may be fed to the D/A converter 410 to generate the convolved analog audio signal based on the generate modified digital audio signal.

In block S608, the generated convolved analog audio signal is fed to an audio reproduction device. For example, generated convolved analog audio signal is fed to the audio reproduction device 448, as previously described.

The process of convolution requires significant signal processing, while not introducing perceivable delays, or latency. Typically, such processing involves multiple finite impulse response (FIR) filters, where the impulse response characteristics can be of significant duration, generally, greater than 100 milliseconds.

One approach to implement a FIR filter is to calculate the convolution in the frequency domain, and in real time. However, with long impulse response characteristics, such an implementation can introduce unacceptable delays into the audio stream.

An alternate solution that allows reaching the low latency requirement is a partitioned convolution algorithm. Partitioning the algorithm enables splitting both the audio and the impulse response characteristics into smaller sub-components and processing them separately in the frequency domain. Then, combined result is then merged into the final signal in the time domain.

Now, referring to FIG. 7A, an example processing of each input stream separately is described. FIG. 7A shows a plurality of input streams, for example, input stream A, input stream B and so on, to input stream X. Each of the input stream is processed by a corresponding FIR filter. For example, input stream A is processed by FIR A to provide output stream A, input stream B is processed by FIR B to provide output stream B, and input stream X is processed by FIR X to provide output stream X.

An alternate solution that allows reaching the low latency requirement is a partitioned convolution algorithm. Partitioning the algorithm enables splitting both the audio and the impulse response characteristics into smaller sub-components and processing them separately in the frequency domain. Then, combined result is then merged into the final signal in the time domain.

The use of partitioned convolution algorithm implies a significant tradeoff between the size of each partition and the required processing time. Reducing partition size results in less latency but requires more processing effort, therefore consuming more energy. However, the increased processing demands can become impractical due to the hardware limitations such as available processing speed or power consumption, particularly in mobile or wearable devices. An improvement to the partitioned convolution algorithm that reduces the need in the processing time and energy is desirable.

In accordance with an example of this disclosure, an alternate example of processing the input streams are described with reference to FIG. 7B. In this example, the input streams are multiplexed by a multiplexer to generate a multiplexed stream of input stream. For example, input stream A, input stream B, and input stream X are multiplexed by the multiplexer to generate a multiplexed input stream. The multiplexed input stream is then processed by a combined FIR filter to generate a multiplexed output stream. The multiplexed output stream is then processed by a de-multiplexer to generate corresponding output stream A, output stream B and output stream X.

As one skilled in the art appreciates, special emulation of audio signals require two or more FIRs processed simultaneously and the system described herein above with reference to FIG. 7B may be advantageously used to process multiple streams of audio signals.

Figure 7C:
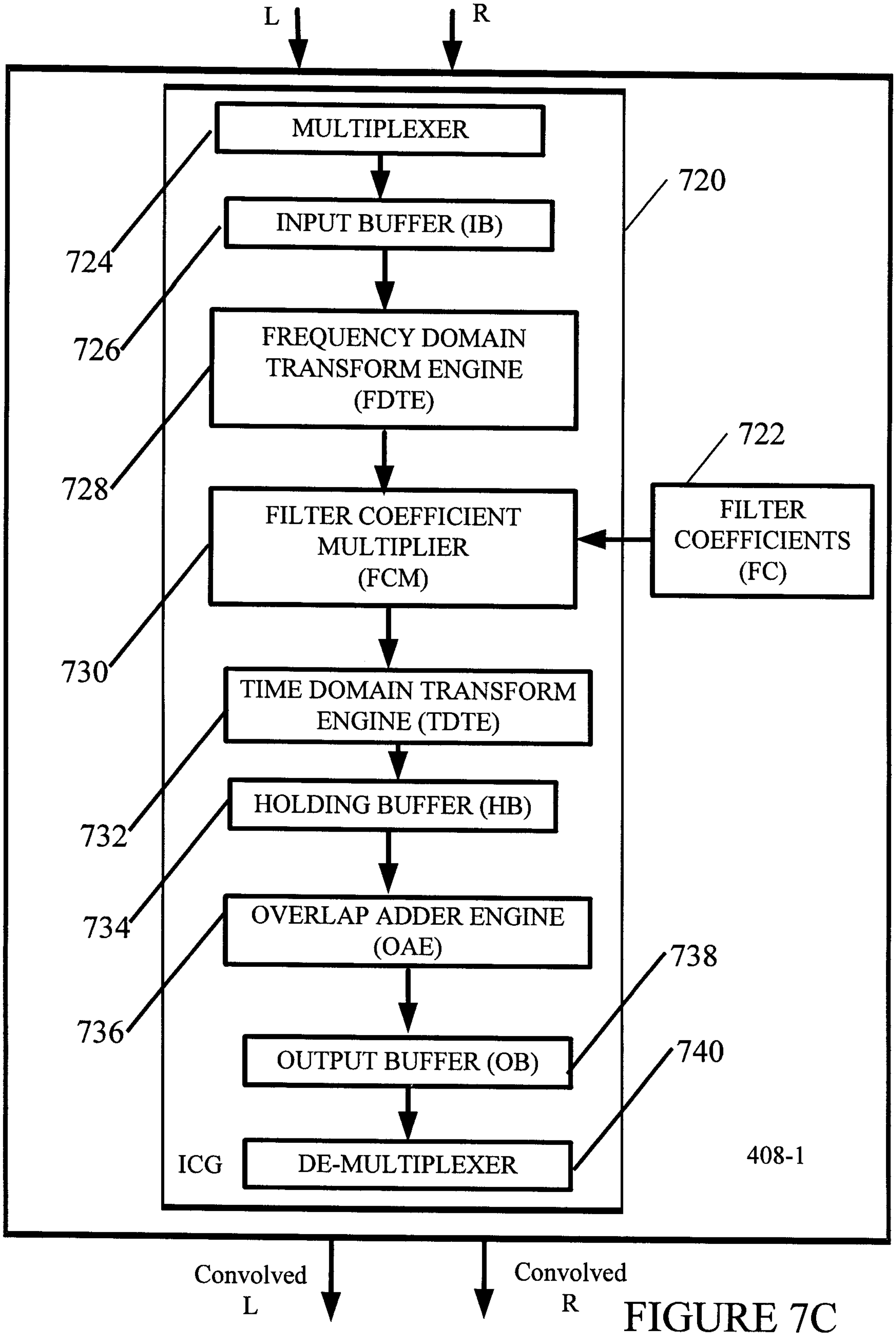
FIG. 7C shows an example digital signal processor, according to an example of this disclosure.

Now, referring to FIG. 7C, another example digital signal processor 408-1 is shown. Digital signal processor 408-1 may be similar to the digital signal processor 408, previously described with reference to FIG. 4, however, only elements associated with generating a convolved digital audio signal is described with reference to FIG. 7C. For example, the integrated convolution generator (ICG) 720 of digital signal processor 408-1 may replace LL convolution generator 436, LR convolution generator 438, RL convolution generator 440 and RR convolution generator 442 of digital signal processor 408 described with reference to FIG. 4. Further, filter coefficients (FC) data store 722 may correspond to selected convolution coefficients datastore 432 described with reference to FIG. 4.

ICG 720 includes a multiplexer 724, input buffer (IB) 726, frequency domain transform engine (FDTE) 728, filter coefficient multiplier (FCM) 730, time domain transform engine (TDTE) 732, holding buffer (HB) 734, overlap adder engine (OAE) 736, output buffer (OB) 738 and de-multiplexed 740.

Multiplexer 724 is configured to receive samples of input audio signals from a plurality of channels. For example, multiplexer 724 may receive a plurality of samples of two channel digital audio signals (L and R). In one example, the received plurality of samples of two channel digital audio signals are multiplexed by the multiplexer 724 and selectively stored in the input buffer 726 so as to be processed together by the FDTE 728.

FDTE 728 converts the received two channel digital audio signals into frequency domain. The FCM 730 selectively multiplies the converted two channel digital audio signals in frequency domain, with corresponding filter coefficients. Output of the FCM 730 is fed to the TDTE 732, which converts the two channel digital audio signals to time domain. Output of the TDTE 732 is stored in a holding buffer 734. Holding buffer 734 is configured to hold output of the TDTE 732 for multiple time periods. Selective output of the TDTE 732 is fed from the holding buffer 734 to the OAE 736.

The OAE 736 selectively adds various samples of the output of the TDTE 732 to generate a combined convolved digital audio signal for both channels. The output of the OAE 736 is stored in the output buffer 738. The demultipexer 740 selectively separates the combined convolved digital audio signal into separate convolved digital audio signal, for example, convolved digital audio signal for L channel and convolved digital audio signal for R channel. Convolved digital audio signal for L channel and convolved digital audio signal for R channel may be further processed as previously described with reference to digital signal processor 408, with reference to FIG. 4.

Figure 7D:
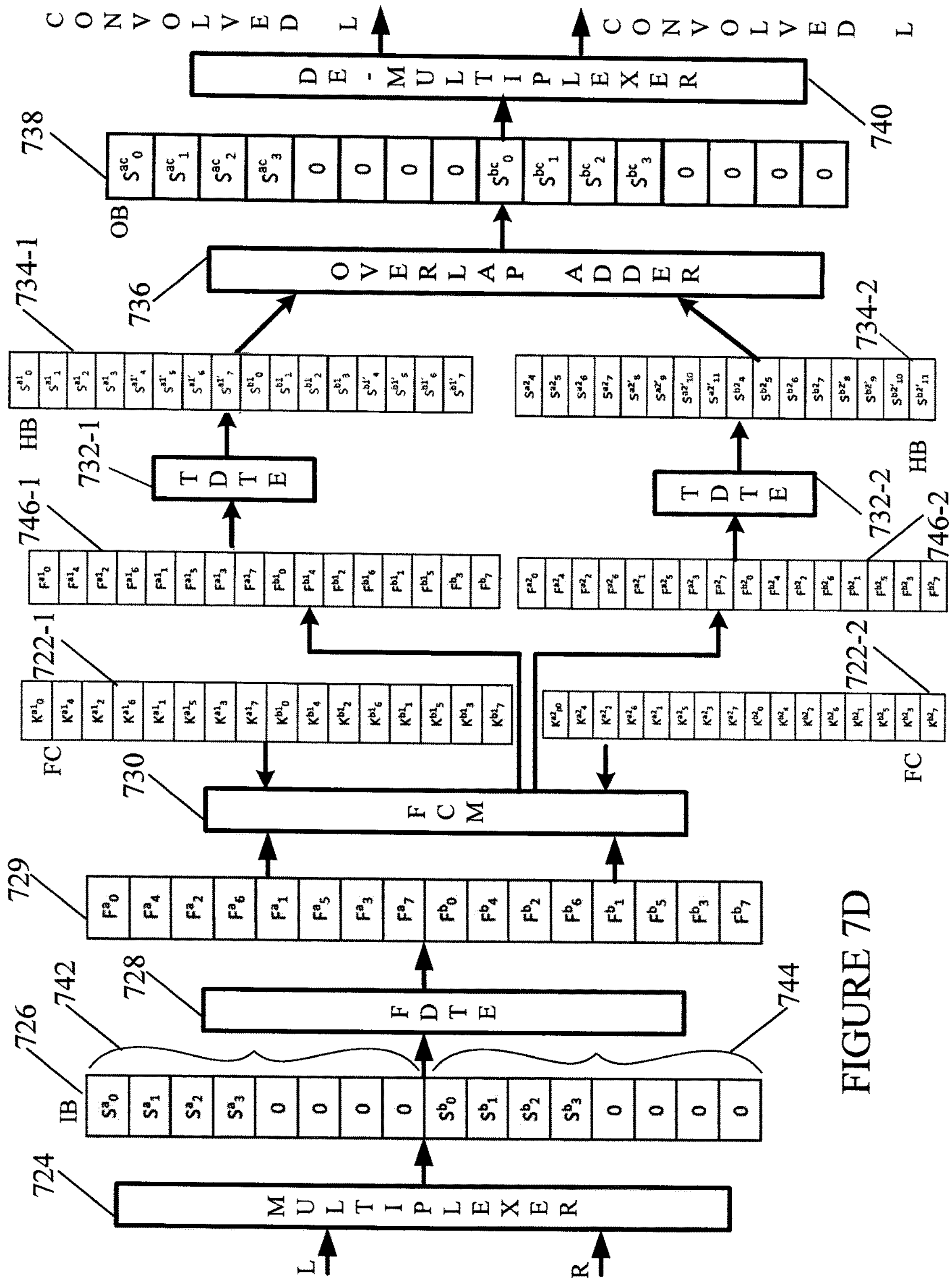
FIG. 7D shows an example processing of various samples of input stream of data by the digital signal processor of FIG. 7B, according to an example of this disclosure.

Now, referring to FIG. 7D, an example processing of various samples of input stream of data by the digital signal processor 408-1 is described. In this example, two channel audio data signal (for example, L channel audio and R channel audio data signal) is processed simultaneously. Multiplexer 724 receives two channel audio data signal. In this example, four samples of data for each channel is processed simultaneously for a given time period. And, two successive subsets of four samples of data provides data related to both short echo and long echo, to generate the convolved digital audio signal for L channel and convolved digital audio signal for R channel. Two successive subsets of four samples of data for L channel are represented as $S^a_0$, $S^a_1$, $S^a_2$, and $S^a_3$ at time t−1 and as $S^a_4$, $S^a_5$, $S^a_6$, and $S^a_7$ at time t. Two successive subsets of four samples of data for R channel are represented as $S^b_0$, $S^b_1$, $S^b_2$, and $S^b_3$ at time t−1 and as $S^b_4$, $S^b_5$, $S^b_6$, and $S^b_7$ at time t.

The input buffer 726 has a first portion 742, configured to receive samples of L channel and a second portion 744, configured to receive samples of R channel. In this example, each of the first portion 742 and the second portion 744 of the input buffer 726 have eight buffers and are configured to hold eight samples of audio signals for each channel (L and R). According to an example of this disclosure, multiplexer 724 loads four samples of the L channel (shown as $S^a_0$, $S^a_1$, $S^a_2$, and $S^a_3$) into only first four of the available eight buffers of the first portion 742 and loads zeros in the second four of the available eight buffers of the first portion 742 for L channel. Similarly, the multiplexer 724 loads four samples of the R channel (shown as $S^b_0$, $S^b_1$ $S^b_2$, and $S^b_3$) into only first four of the available eight buffers of the second portion 744 and loads zeros in the second four of the available eight buffers of the second portion 744 for R channel. This selective partial loading of the samples in the input buffer 726 advantageously keeps the processed data separated by each L channel and R channel, when the FDTE 728 processes the samples of audio signals of L channel and R channel.

In general, samples x for each channel may chosen as $x=2^p$, where p is an integer and number of buffers in each of the first portion 742 and second portion 744 will be $2\times2^p$, so that there will be equal number of samples and zeroes in the first portion 742 and second portion 744. In this example, p=2, number of samples will be $x=2^2=4$ and number of buffers in the first portion 742 and second portion 744 is $2\times2^2=2\times4=8$. And, first four buffers in each of the first portion 742 and second portion 744 are filled with samples and rest of the four buffers in each of the first portion 742 and second portion 744 are filled with zeroes.

The samples of the first portion 742 is processed by the FDTE 728 and the samples are transformed into frequency domain components (shown as $F^a_0$, $F^a_1$, $F^a_3$, $F^a_4$, $F^a_5$, $F^a_6$, and $F^a_7$) for channel L and shown in FDTE output 729. Similarly, samples of the second portion 744 is processed by the FDTE 728 and the samples are transformed into frequency domain components (shown as $F^b_0$, $F^b_1$, $F^b_2$, $F^b_3$, $F^b_4$, $F^b_5$, $F^b_6$, and $F^b_7$) for channel R and shown in FDTE output 729. Difference between a traditional 16 input FFT and FDTE 728 of this disclosure will be further described with reference to FIGS. 8A and 8B.

Next, there are two sets of filter coefficients, one for short echo and another for long echo. First filter coefficient 722-1 correspond to short echo and second filter coefficient 722-2 corresponds to long echo. For example, the first filter coefficients 722-1 include coefficients $K^{a1}_0$ $K^{a1}_1$, $K^{a1}_3$ $K^{a1}_4$ $K^{a1}_5$, $K^{a1}_6$ and $K^{a1}_7$, corresponding to channel L. Each of these filter coefficients are multiplied with corresponding frequency domain components $F^a_0$, $F^a_1$, $F^a_3$, $F^a_4$, $F^a_5$, $F^a_6$, and $F^a_7$ by the FCM 730, to yield an output of $F^{a1}_0$, $F^{a1}_1$, $F^{a1}_3$, $F^{a1}_4$, $F^{a1}_5$, $F^{a1}_6$, and $F^{a1}_7$ respectively, for channel L. For example, $Fa_0$ is multiplied with $K^{a1}_0$ to yield an output of $F^{a1}_0$. The output is still represented in frequency domain. The output includes effect of short echo for channel L. These outputs may be referred to as frequency domain components with short echo effect for channel L.

The first filter coefficients 722-1 also include coefficients $K^{b1}_0$, $K^{b1}_1$, $K^{b1}_3$, $K^{b1}_4$, $K^{b1}_5$, $K^{b1}_6$, and $K^{b1}_7$, corresponding to channel R. Each of these filter coefficients are multiplied with corresponding frequency domain components $F^b_0$, $F^b_1$, $F^b_3$, $F^b_4$, $F^b_5$, $F^b_6$, and $F^b_7$ by the FCM 730, to yield an output of $F^{b1}_0$, $F^{b1}_1$, $F^{b1}_3$, $F^{b1}_4$, $F^{b1}_5$, $F^{b1}_6$, and $F^{b1}_7$ respectively, for channel R. For example, $F^b_0$ is multiplied with $K^{b1}_0$ to yield an output of $F^{b1}_0$. The output is still represented in frequency domain. The output includes effect of short echo for channel R. These outputs may be referred to as frequency domain components with short echo effect for channel R.

The second filter coefficients 722-2 include coefficients $K^{a2}_0$, $K^{a2}_1$, $K^{a2}_3$, $K^{a2}_4$, $K^{a2}_5$, $K^{a2}_6$, and $K^{a2}_7$, corresponding to channel L. Each of these filter coefficients are multiplied with corresponding frequency domain components $F^a_0$, $F^a_1$, $F^a_3$, $F^a_4$, $F^a_5$, $F^a_6$, and $F^a_7$ by the FCM 730, to yield an output of $F^{a2}_0$, $F^{a2}_1$, $F^{a2}_3$, $F^{a2}_4$, $F^{a2}_5$, $F^{a2}_6$, and $F^{a2}_7$ respectively, for channel L. For example, $Fa_0$ is multiplied with $K^{a2}_0$ to yield an output of $F^{a2}_0$. The output is still represented in frequency domain. The output includes effect of long echo for channel L. These outputs may be referred to as frequency domain components with long echo effect for channel L.

The second filter coefficients 722-2 also include coefficients $K^{b2}_0$, $K^{b2}_1$, $K^{b2}_3$, $K^{b2}_4$, $K^{b2}_5$, $K^{b2}_6$, and $K^{b2}_7$, corresponding to channel R. Each of these filter coefficients are multiplied with corresponding frequency domain components $F^b_0$, $F^b_1$, $F^b_3$, $F^b_4$, $F^b_5$, $F^b_6$, and $F^b_7$ by the FCM 730, to yield an output of $F^{b2}_0$, $F^{b2}_1$, $F^{b2}_3$, $F^{b2}_4$, $F^{b2}_5$, $F^{b2}_6$, and $F^{b2}_7$ respectively, for channel R. For example, $F^b_0$ is multiplied with $K^{b2}_0$ to yield an output of $F^{b2}_0$. The output is still represented in frequency domain. The output includes the effect of long echo for channel R. These outputs may be referred to as frequency domain components with long echo effect for channel R.

The output of the FCM 730 corresponding to short echo stored in buffer 746-1 is then processed by the TDTE 732-1 and the output of the TDTE 732-1 is stored in first holding buffer 734-1. TDTE 732-1 converts the output of the FCM 730 from frequency domain to time domain. For example, output of the TDTE 732-1 corresponding to input samples $S^a_0$, $S^a_1$, $S^a_2$, and $S^a_3$ at time t−1 are shown as $S^{a1}_0$, $S^{a1}_1$, $S^{a1}_2$, and $S^{a1}_3$ and $S^{a1'}_4$, $S^{a1'}_5$, $S^{a1'}_6$, and $S^{a1'}_7$ in the first holding buffer 734-1. The output of the TDTE 732-1 in the first holding buffer 734-1 shown as $S^{a1}_0$, $S^{a1}_1$, $S^{a1}_2$, and $S^{a1}_3$ will be selectively used in time t−1. The output of the TDTE 732-1 in the first holding buffer 734-1 shown as $S^{a1'}_4$, $S^{a1'}_5$, $S^{a1'}_6$, and $S^{a1'}_7$ in the first holding buffer 734-1 will be selectively used in the next time slot, namely time t.

TDTE 732-1 converts the output of the FCM 730 from frequency domain to time domain. For example, output of the TDTE 732-1 corresponding to input samples $S^b_0$, $S^b_1$, $S^b_2$, and $S^b_3$ at time t−1 is shown as $S^{b1}_0$, $S^{b1}_1$, $S^{b1}_2$, and $S^{b1}_3$ $S^{b1'}_4$, $S^{b1'}_5$, $S^{b1'}_6$, and $S^{b1'}_7$ in the first holding buffer 734-1. The output of the TDTE 732-1 in the first holding buffer 734-1 shown as $S^b_0$, $S^b_1$, $S^b_2$, and $S^b_3$ will be selectively used in time t−1. The output of the TDTE 732-1 in the first holding buffer 734-1 shown as $S^{b1'}_4$, $S^{b1'}_5$, $S^{b1'}_6$, and $S^{b1'}_7$ in the first holding buffer 734-1 will be selectively used in the next time slot, namely time t.

In other words, when the output of the FCM when converted from frequency domain to time domain by the TDTE, two sets of output are generated. A selective first set of output will have effect on the output signal at then current time period (in this case, time t−1) and a selective second set of output will have effect on the output signal at next time period (in this case, time t).

The output of the FCM 730 corresponding to long echo stored in buffer 746-2 is then processed by TDTE 732-2 and converts the output from frequency domain to time domain. The output of the TDTE 732-2 is stored in second holding buffer 734-2.

For example, output of the TDTE 732-2 corresponding to input samples $S^a_0$, $S^a_1$, $S^a_2$, and $S^a_3$ at time t−1 is shown as $S^{a2}_4$, $S^{a2}_5$, $S^{a2}_6$, and $S^{a2}_7$ and $S^{a2'}_8$, $S^{a2'}_9$, $S^{a2'}_{10}$, and $S^{a2'}_{11}$ in the second holding buffer 734-2. The output of the TDTE 732-2 in the second holding buffer 734-2 shown as $S^{a2}_4$, $S^{a2}_5$, $S^{a2}_6$, and $S^{a2}_7$ will be selectively used in subsequent time t, as this corresponds to long echo effect. The output of the TDTE 732-2 in the second holding buffer 734-2 shown as $S^{a2'}_8$, $S^{a2'}_9$, $S^{a2'}_{10}$, and $S^{a2'}_{11}$ in the second holding buffer 734-2 may be selectively used subsequently in one of the next time slots after time t, depending upon the long echo effect of input samples $S^a_0$, $S^a_1$, $S^a_2$, and $S^a_3$.

In other words, when the output of the FCM when converted from frequency domain to time domain by the TDTE, two sets of output are generated. In the case of long echo effect, a selective first set of output will have effect on the output signal at the next time period (in this case, time t) and a selective second set of output will have effect on the output signal at a subsequent time period, depending upon the residual effect of the long echo beyond one time period.

TDTE 732-2 converts the output of the FCM 730 for long echo from frequency domain to time domain. For example, output of the TDTE 732-2 corresponding to input samples $S^b_0$, $S^b_1$, $S^b_2$, and $S^b_3$ at time t−1 is shown as $S^{b2}_4$, $S^{b2}_5$, $S^{b2}_6$, and $S^{b2}_7$ and $S^{b2'}_8$, $S^{b2'}_9$, $S^{b2'}_{10}$, and $S^{b2'}_{11}$ in the second holding buffer 734-2. The output of the TDTE 732-2 in the second holding buffer 734-2 shown as $S^{b2}_4$, $S^{b2}_5$, $S^{b2}_6$, and $S^{b2}_7$ will be selectively used in subsequent time t, as this corresponds to long echo effect. The output of the TDTE 732-2 in the second holding buffer 734-2 shown as $S^{b2'}_8$, $S^{b2'}_9$, $S^{b2'}_{10}$, and $S^{b2'}_{11}$ in the second holding buffer 734-2 may be selectively used in one of the next time slots after time t, depending upon the long echo effect of input samples $S^a_0$, $S^a_1$, $S^a_2$, and $S^a_3$.

Selective samples of the first holding buffer 734-1 and second holding buffer 734-2 are added by the OAE 736, to generate convolved audio signal for L channel and R channel and stored in the output buffer 738. For example, convolved audio signal for L channel are $S^{ac}0$, $S^{ac}2$, and $S^{ac}3$. Similarly, convolved audio signal for R channel are $S^{bc}0$, $S^{bc}1$, $S^{bc}2$, and $S^{bc}3$. Functions and features of the OAE 736 will be further described with reference to FIG. 7E.

The de-multiplexer 740 selectively retrieves the convolved audio signal for L channel and R channel from the output buffer 738 and outputs as convolved L channel and convolved R channel signals. For example, convolved $S^{ac}0$, $S^{ac}1$, $S^{ac}2$, and $S^{ac}3$ signals are output in sequence by the de-multiplexer 740 as convolved L channel signals. And, convolved $S^{bc}0$, $S^{bc}1$, $S^{bc}2$, and $S^{bc}3$ signals are output in sequence by the de-multiplexer 740 as convolved R channel signals.

Figure 7E:
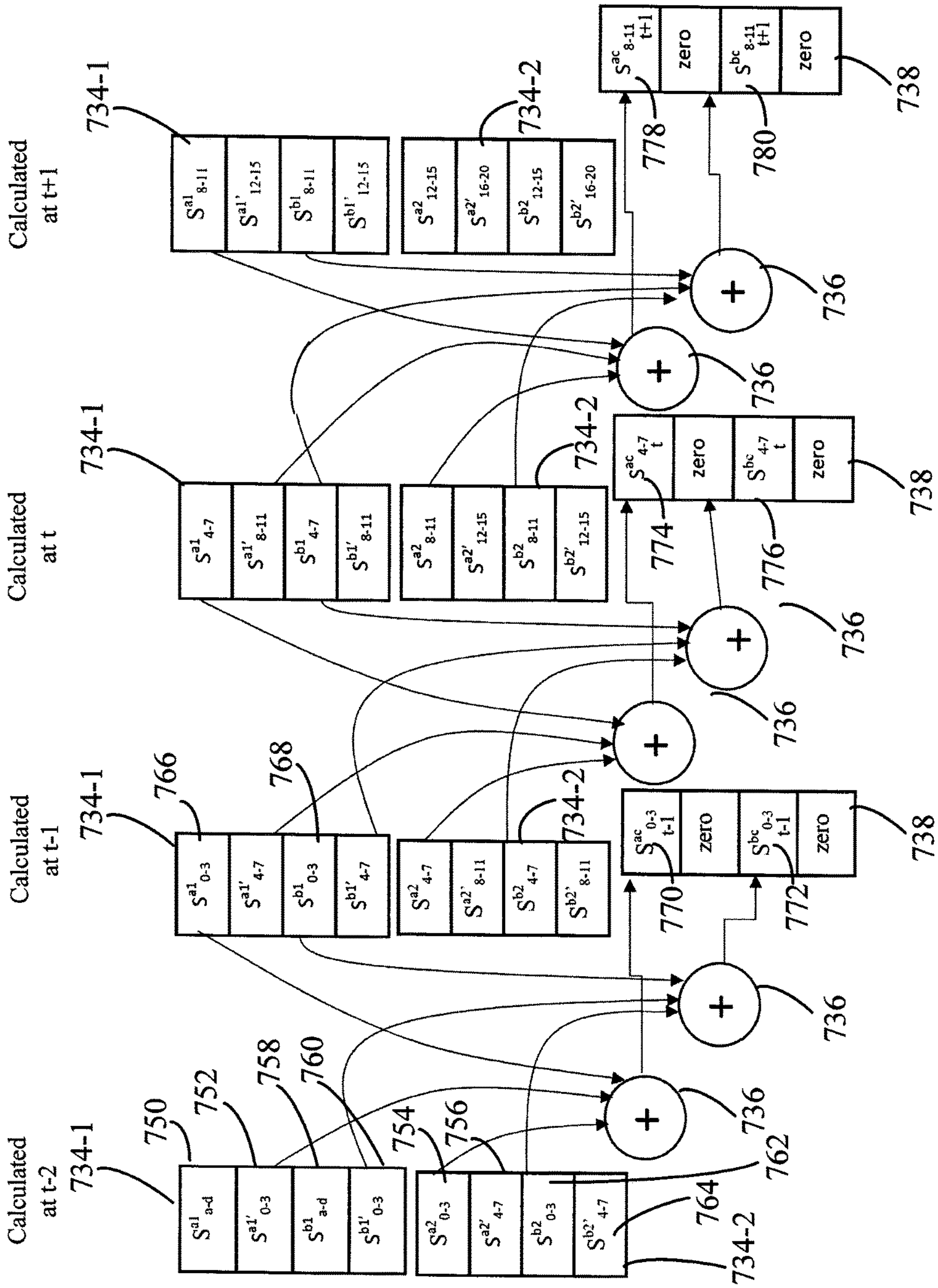
FIG. 7E shows an example operation of the overlap adder engine of the digital signal processor of FIG. 7B, according to an example of this disclosure.

Now, referring to FIG. 7E, various functions and features of the OAE 736 will be described. As previously described, selective samples of the first holding buffer 734-1 and second holding buffer 734-2 are added by the OAE 736, to generate convolved audio signal for L channel and R channel and stored in the output buffer 738. FIG. 7E shows content of the first holding buffer 734-1 and second holding buffer 734-2, after processing various samples of the input signal for L channel and R channel, at times t−2, t−1, t and t+1.

For example, output of the TDTE 732-1 corresponding to input samples $S^a_a$, $S^a_b$, $S^a_c$, and $S^a_d$ for L channel at time t−2 is shown in the first holding buffer 734-1 as $S^{a1}_a$, $A^{a1}_b$, $S^{a1}_c$, and $S^{a1}_d$ in cell 750, and $S^{a1'}_0$ $S^{a1'}_1$, $S^{a1'}_2$, and $S^{a1'}_3$ in cell 752.

Similarly, output of the TDTE 732-2 corresponding to input samples $S^a_a$, $S^a_b$, $S^a_c$, and $S^a_d$ at time t−2 is shown in the second holding buffer 734-2 as $S^{a2}_0$, $S^{a2}_1$, $S^{a2}_2$, and $S^{a2}_3$ in cell 754 and $S^{a2'}_4$, $S^{a2'}_5$, $S^{a2}_6$ and $S^{a2'}_7$ in cell 756.

For example, output of the TDTE 732-1 corresponding to input samples $S^b_a$, $S^b_b$, $S^b_c$, and $S^b_d$ for R channel at time t−2 is shown in the first holding buffer 734-1 as $S^{b1}_a$, $S^{b1}_b$, $S^{b1}_c$, and $S^{b1}_d$ in cell 758 and as $S^{b1'}_0$, $S^{b1'}_1$, $S^{b1'}_2$, and $S^{b1'}_3$ in cell 760.

Similarly, output of the TDTE 732-2 corresponding to input samples $S^b_a$, $S^b_b$, $S^b_c$, and $S^b_d$ at time t−2 is shown in the second holding buffer 734-2 as $S^{b2}_0$, $S^{b2}_1$, $S^{b2}_2$, and $S^{b2}_3$ in cell 762 and as $S^{b2'}_4$, $S^{b2'}_5$, $S^{b2'}_6$, and $S^{b2'}_7$ in cell 764.

Output of the TDTE 732-1 corresponding to input samples $S^a_0$, $S^a_1$, $S^a_2$, and $S^a_3$ for L channel at time t−1 is shown in the first holding buffer 734-1 as $S^{a1}_0$, $S^{a1}_1$, $S^{a1}_2$, and $S^{a1}_3$ in cell 766 and $S^{b1}_0$, $S^{b1}_1$, $S^{b1}_2$, and $S^{b1}_3$ in cell 768.

In general, subscripts (a-d), (0-3), (4-7), (8-11), (12-15), (16-20) in holding buffers 734-1 and 734-2 for each calculated time slot (for example, time slots t−2, t−1, t, and t+1) indicate the output samples for which the corresponding block of data for short echo effect and long echo effect is selectively added by the OAE 736.

Having shown contents of the holding buffer at various time slots for various input samples, function of the OAE 736 is now described. At time t−1, the OAE 736 selectively adds the contents of cell 752, which holds $S^{a1'}_{0\text{-}3}$ (from time t−2) with contents of cell 754 which holds $S^{a2}_{0\text{-}3}$ (from time t−2) and contents of cell 766, which holds $S^{a1}_{0\text{-}3}$ (from time t−1) to generate convolved output $S^{ac}_{0\text{-}3}$ as shown in cell 770 of output buffer 738, as convolved output at time t−1, for L channel.

Similarly, the OAE 736 selectively adds the contents of cell 760, which holds $S^{b1'}_{0\text{-}3}$ (from time t−2) with contents of cell 762 which holds $S^{b2}_{0\text{-}3}$ (from time t−2) and contents of cell 768, which holds $S^{b1}_{0\text{-}3}$ (from time t−1) to generate convolved output $S^{bc}_{0\text{-}3}$ as shown in cell 772 of output buffer 738, as convolved output at time t−1, for R channel.

The OAE 736 selectively adds selective contents of the holding buffer 734-1 and 734-2 at various time slots to generate corresponding convolved output for L channel and R channel. For example, cell 774 shows convolved output $S^{ac}{}_{4\text{-}7}$ (at time t) for L channel and cell 766 shows convolved output $S^{bc}{}_{4\text{-}7}$ (at time t) for R channel. Similarly, cell 778 shows convolved output $S^{ac}{}_{8\text{-}11}$ (at time t+1) for L channel and cell 780 shows convolved output $S^{bc}{}_{8\text{-}11}$ (at time t+1) for R channel.

As one skilled in the art appreciates, the overlap adder selectively adds portions of the output of the TDTE with short echo effect and long echo effect from a given time period with portions of the output of the TDTE from the next time period to generate a convolved output signal.

As one skilled in the art appreciates, there can be additional filter coefficients representing additional convolution to the input signal. For example, there can be a set of filter coefficients representing say, a long-long echo (for example, due to multiple reflections of the sound signal in a specified space), which may have an effect on a subsequent set of input signal. As an example, signals sampled at time t−2 may have an effect on the convolved output signal at time t. Example system described with reference to FIGS. 7D and 7E may be advantageously modified to accommodate for additional filter coefficients. These additional filter coefficients are then selectively multiplied with the output of the FDTE 729 to generate an output, which is further converted to time domain by the TDTE 732 to yield output in time domain that is stored in the holding buffer 734, output of which is selectively added by the overlap adder to generate a convolved output signal.

Although example system herein is described with reference to two channels of input signal, system described herein may be expanded to additional channels of input signal, with corresponding additional processing circuitry.

Figure 8A:
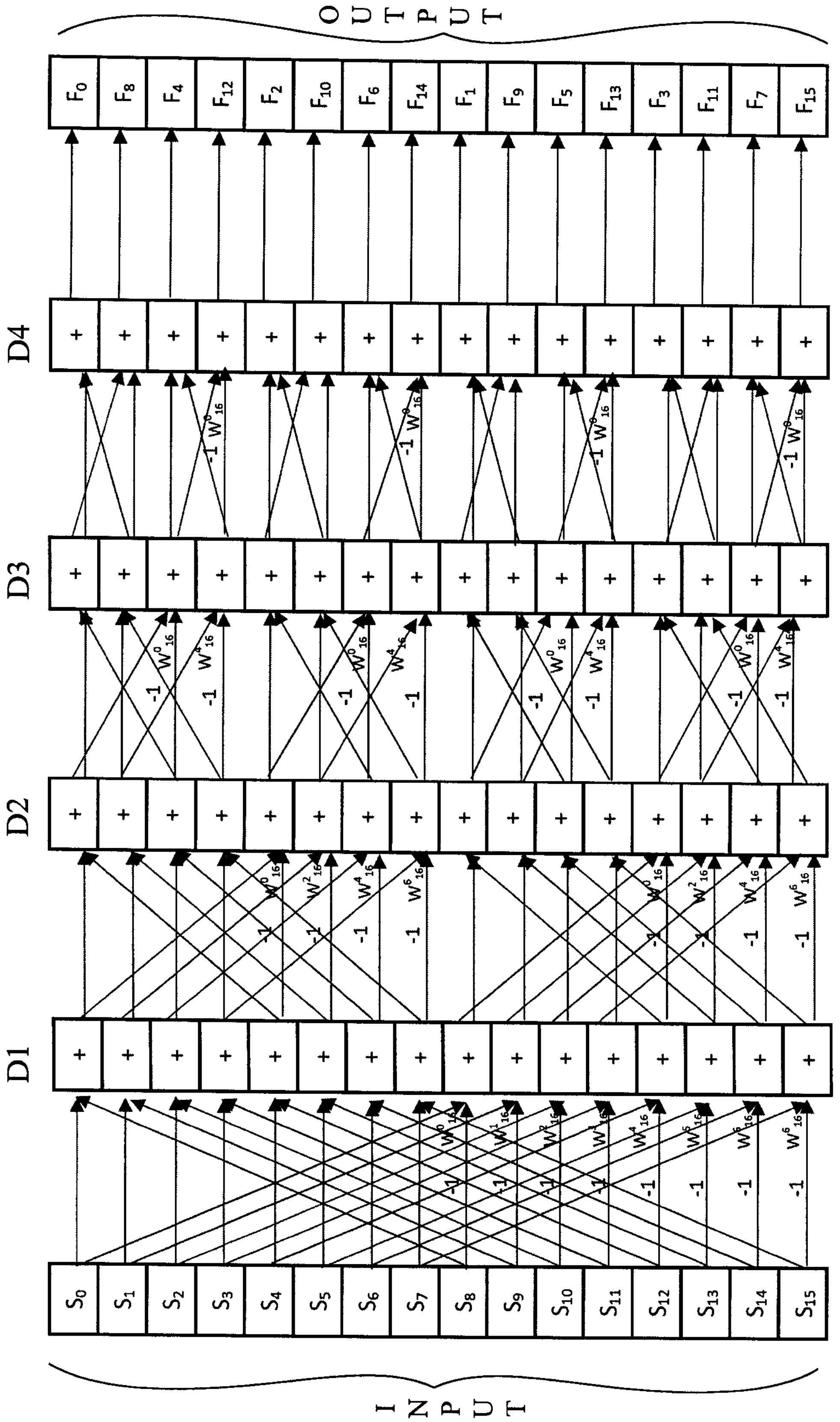
FIG. 8A shows an example operation of a typical fast fourier transform engine, with decimation in frequency algorithm, according to an example of this disclosure.
Figure 8B:
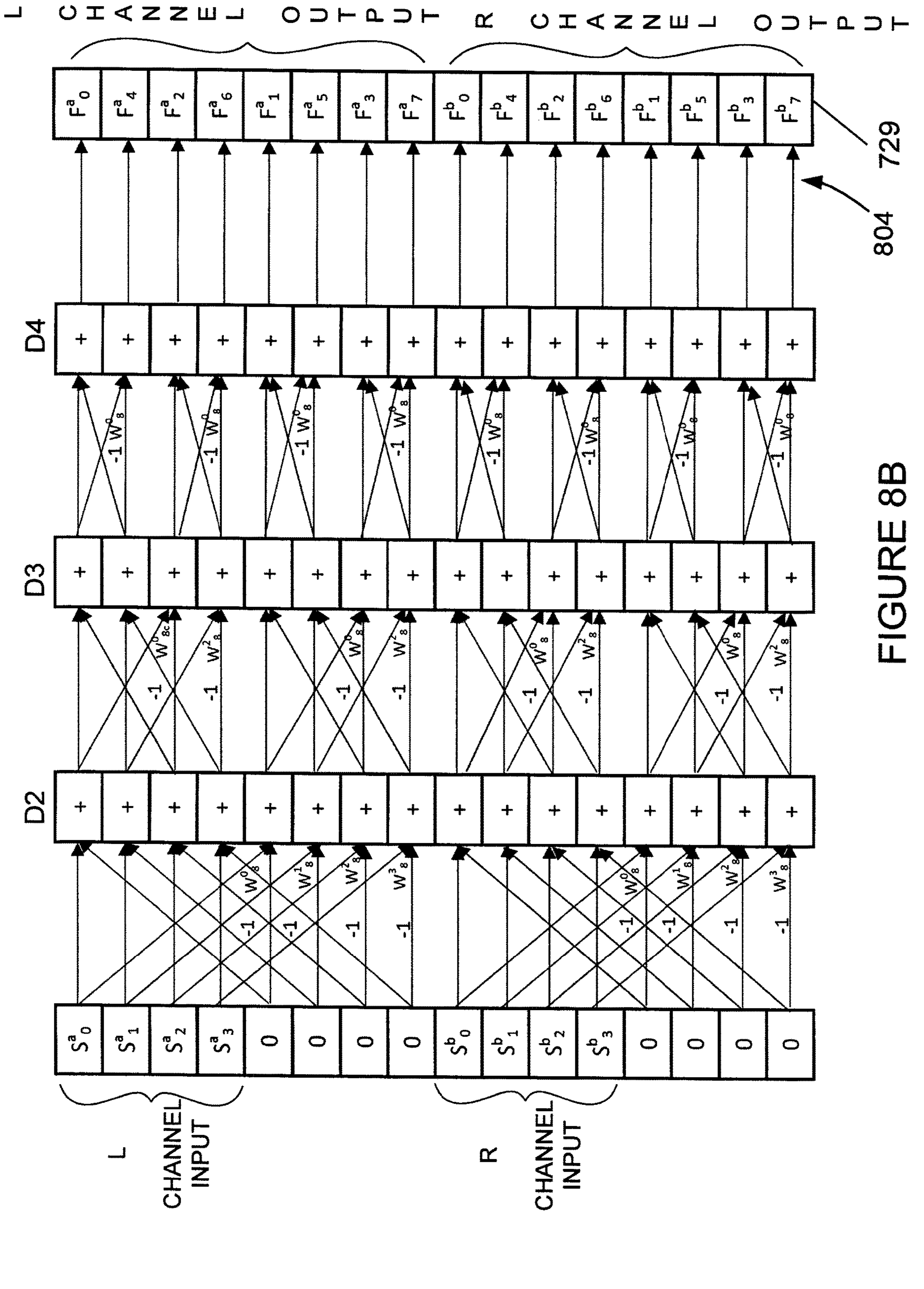
FIG. 8B shows an example operation of a modified fast fourier transform engine, with decimation in frequency algorithm, according to an example of this disclosure.

Now, referring to FIGS. 8A and 8B, salient differences between a traditional 16 input FFT and modified FFT used in FDTE 728 is described. FIG. 8A shows a traditional FFT 802 with decimation in frequency FFT algorithm. FFT 802 is configured to process 16 inputs $S_0$ to $S_{16}$ received in time domain. The twiddle factors w are calculated for 16 point FFT for FFT 802. The FFT 802 goes through four decimation steps, namely D1, D2, D3, and D4 and gives an output $F_0$-$F_{15}$ in frequency domain. As one skilled in the art appreciates, the sequence of the output $F_0$-$F_{15}$ is bit reversed, in the sense, the output sequence for inputs $S_0$ to $S_7$ are intermingled with output sequence for inputs $S_8$ to $S_{16}$. When we multiplex L channel input with R channel input, the output of the FFT 802 will provide a bit reversed output, intermingling output corresponding to L channel with output corresponding to R channel.

Now, referring to FIG. 8B, modified FFT 804 is described. Modified FFT 804 is configured to process 16 inputs, with first 8 inputs allocated to L channel (first portion 742, with p=2) and second 8 inputs are allocated to R channel (second portion 744, with p=2). Further, of the first 8 inputs allocated to L channel, only four inputs are used ($S^a{}_0$, $S^a{}_1$, $S^a{}_2$, and $S^a{}_3$) and rest of the inputs are set to zero. Of the second 8 inputs allocated to R channel, only four inputs are used ($S^b{}_0$, $S^b{}_1$, $S^b{}_2$, and $S^b{}_3$) and rest of the inputs are set to zero. The twiddle factors w are calculated for 8 point FFT for modified FFT 804. The modified FFT 804 goes through three decimation steps, namely D2, D3, and D4. Modified FFT 804 gives an output $F^a{}_0$-$F^a{}_7$ in frequency domain for L channel input ($S^a{}_0$, $S^a{}_1$, $S^a{}_2$, and $S^a{}_3$) and an output $F^a{}_8$-$F^a{}_{15}$ in frequency domain for R channel input ($S^b{}_0$, $S^b{}_1$, $S^b{}_2$, and $S^b{}_3$), as shown in block 729. Modified FFT 804 as described herein provides a separation between L channel output and R channel output in frequency domain. This facilitates further processing of the input signal in frequency domain, while maintaining separation between L channel and R channel inputs.

In general, number of decimation steps yin the modified FFT 804 will be equal to p+1. So, for a value of p=2, the number of decimation steps y will be 2+1=3, and the sample size x for each channel will be $2^p$, which is equal to $2^2$=4. And, for a value of p=3, the number of decimation steps y will be 3+1=4, and the sample size x for each channel will be $2^p$, which is equal to $2^3$=8.

Figure 9A:
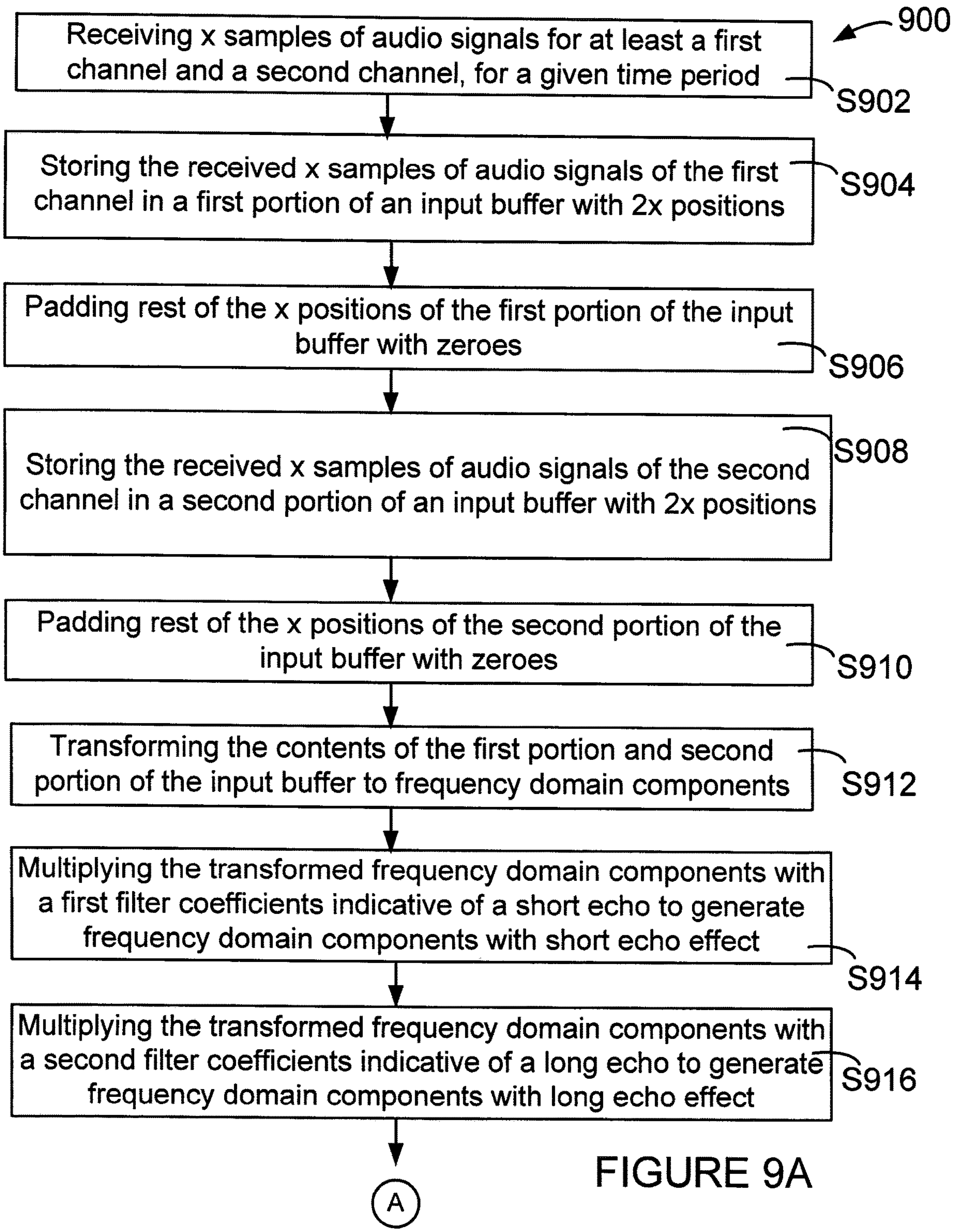
FIGS. 9A and 9B show another example flow diagram, according to an example of this disclosure.
Figure 9B:
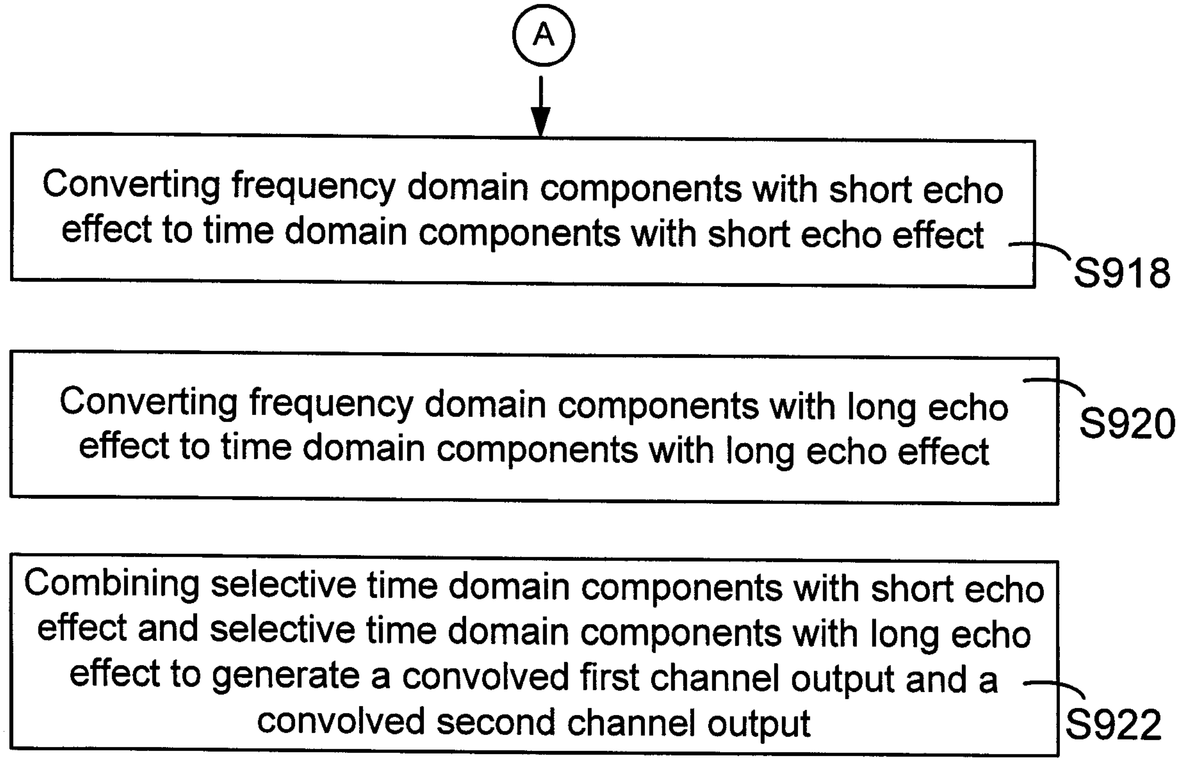

Now, referring to FIGS. 9A and 9B, an example flow diagram 900 will be described. In block S902, x samples of audio signals for at least a first channel and a second channel will be received, for a given time period. For example, the digital signal processor 408-1, as previously described, will receive samples of audio signals from L channel as samples $S^a0$, $S^a1$, $S^a2$, and $S^a3$ and samples of audio signals from R channel as samples $S^b0$, $S^b1$, $S^b2$, and $S^b3$.

In block S904, the received x samples of audio signals of the first channel is stored in a first portion of an input buffer, with 2x positions. For example, the received samples of the first channel is stored in first portion 742 of the input buffer 726. For example, samples $S^a0$, $S^a1$, $S^a2$, and $S^a3$ are stored in the first portion 742 of the input buffer 726.

In block S906, rest of the x positions of the first portion of the input buffer is padded with zeros. For example, referring to FIG. 7D, we notice, rest of the 4 positions of the first portion 742 are filled with zeroes.

In block S908, the received x samples of audio signals of the second channel is stored in a second portion of an input buffer, with 2x positions. For example, the received samples of the second channel is stored in the second portion 744 of the input buffer 726. For example, samples $S^b0$, $S^b1$, $S^b2$, and $S^b3$ are stored in the second portion 744 of the input buffer 726.

In block S910, rest of the x positions of the second portion of the input buffer is padded with zeros. For example, referring to FIG. 7D, we notice, rest of the 4 positions of the second portion 744 are filled with zeroes.

In block S912, the contents of the first portion and the second portion are transformed to frequency domain components. For example, contents of the first portion of the input buffer is transformed into frequency domain components as $F^a0$, $F^a1$, $F^a2$, $F^a3$, $F^a4$, $F^a5$, $F^a6$ and $F^a7$, by the frequency domain transformation engine 728, as shown in FDTE output 729. And, contents of the second portion of the input buffer is transformed into frequency domain components as $F^b0$, $F^b1$, $F^b2$, $F^b3$, $F^b4$, $F^b5$, $F^b6$ and $F^b7$, by the frequency domain transformation engine 728, as shown in FDTE output 729.

In block S914, the transformed frequency domain components are multiplied with a first filter coefficients indication of a short echo, to generate frequency domain components with short echo effect. For example, the transformed frequency domain components shown in FDTE output 729 are multiplied with filter coefficients 722-1, to generate frequency domain components with short echo effect, as shown in block 746-1.

In block S916, the transformed frequency domain components are multiplied with a second filter coefficients indication of a long echo, to generate frequency domain components with long echo effect. For example, the transformed frequency domain components shown in FDTE output 729 are multiplied with filter coefficients 722-2, to generate frequency domain components with long echo effect, as shown in block 746-2.

In block S918, the frequency domain components with short echo effect are converted to time domain components with short echo effect. For example, the time domain transformation engine 732 converts the frequency domain components with short echo in block 746-1 to time domain components with short echo effect, as shown in block 734-1.

In block S920, the frequency domain components with long echo effect are converted to time domain components with long echo effect. For example, the time domain transformation engine 732 converts the frequency domain components with long echo in block 746-2 to time domain components with long echo effect, as shown in block 734-2.

In block S922, selective time domain components with short echo effect and selective time domain components with long echo effect are combined to generate a convolved first channel output and a convolved second channel output. For example, overlap adder 736 selectively adds time domain components with short echo effect and selective time domain components with long echo effect, as described in detail, with reference to FIG. 7E.

Example Application 1

People who create professional audio content, including but not limited to musicians, recording engineers, producers, sound producers, mixers, often struggle due to the limitations of traditional headphones. This requires them to seek professionally-treated physical spaces to deliver professional-sounding content. This includes high fidelity loudspeakers, carefully designed positioning and geometry of hard surfaces within the room such as walls, ceiling, and other reflective objects which shape the sound. The result of this space is to deliver an optimal sound experience with the listener located at a well-defined location, sometimes referred to as the "sweet spot" in the room. However, it is not practical for many audio professionals to utilize sonically-treated spaces, such as recording studios. These spaces typically cost money, may be in inconvenient locations, and require advance reservations. Yet many professionals prefer to work with headphones.

The physical space emulation described in this disclosure enables creating all of the effects of a professionally-treated physical space within headphones, whenever and where ever inspiration strikes. By modeling multiple different recording studio spaces and allowing the user to alternately selecting them, the content creator can even test their work in different virtual studios with the same set of headphones—even if the studios are geographically dispersed. For example, a recording engineer can test their work in an emulated studio located in Los Angeles, another studio in London, and a third in Nashville, all with the same set of headphones.

Example Application 2

Our perception is trained to sense stereo sound in three-dimensional space. Traditional stereo headphones isolate our two ears and destroy that perception. Many people prefer to perceive sound with the sensation of emulated 3D space. For example, music sounds more natural and less fatiguing according to this disclosure and is generally more desirable. Since most music is created in carefully designed recording studios, adding emulation of a studio space to music allows the listener to enjoy a sonic experience that is similar to that intended by the producer, recording engineer and artist creators. Additionally, live venue spaces can also be emulated, allowing the listener to experience music as if she were hearing it in a dance club, concert hall, outside concert venue, or any other physical space which can be modeled.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method for enhancing audio reproduced by an audio reproduction device, including:

receiving x samples of audio signals for at least a first channel and a second channel, for a given time period by a digital signal processor;

storing the received x samples of audio signals of the first channel in a first portion of an input buffer with 2x positions;

padding rest of the x positions of the first portion of the input buffer with zeroes;

storing the received x samples of audio signals of the second channel in a second portion of the input buffer with 2x positions;

padding rest of the x positions of the second portion of the input buffer with zeroes;

transforming the contents of the first portion and second portion of the input buffer to frequency domain components, by a frequency domain transformation engine;

multiplying the transformed frequency domain components with a first filter coefficients indicative of a short echo to generate frequency domain components with short echo effect, by a filter coefficient multiplier;

multiplying the transformed frequency domain components with a second filter coefficients indicative of a long echo to generate frequency domain components with long echo effect, by the filter coefficient multiplier;

converting the frequency domain components with short echo effect to a time domain components with short echo effect, by a time domain transformation engine;

converting the frequency domain components with long echo effect to a time domain components with long echo effect, by the time domain transformation engine; and combining selective time domain components with short echo effect and selective time domain components with long echo effect by an overlap adder engine to generate a convolved first channel output and a convolved second channel output.

2. The method of claim 1, wherein the first filter coefficients and the second filter coefficients are generated based on a predefined space, and the convolved first channel output and the convolved second channel output represent the effect of the predefined space on the received audio signals for the first channel and the second channel.

3. The method of claim 1, further including:

generating a convolved first channel analog audio signal based on the convolved first channel output;

generating a convolved second channel analog audio signal based on the convolved second channel output; and and feeding the convolved analog first channel analog audio signal and the convolved second channel analog audio signal to the audio reproduction device.

4. The method of claim 1, wherein transforming the contents of the first portion and second portion of the input buffer to frequency domain components further including y decimation in frequency steps in the frequency domain transformation engine, where $x=2^p$ and $y=p+1$.

5. The method of claim 1, wherein combining selective time domain components with short echo effect and selective time domain components with long echo effect to generate a convolved first channel output and a convolved second channel output further includes selectively combing a combination of time domain components from a current time period and a previous time period.

6. The method of claim 1, further including, adding a CH distortion to the convolved first channel output and the convolved second channel output.

7. The method of claim 3, further including, adding correction to the convolved first channel output and the convolved second channel output with mid side modification based on a middle-side filter, before generating the analog audio signal.

8. A system to enhance audio reproduced by an audio reproduction device, including:

receive x samples of audio signals for at least a first channel and a second channel, for a given time period, by a digital signal processor;

store the received x samples of audio signals of the first channel in a first portion of an input buffer with 2x positions;

pad rest of the x positions of the first portion of the input buffer with zeroes;

store the received x samples of audio signals of the second channel in a second portion of the input buffer with 2x positions;

pad rest of the x positions of the second portion of the input buffer with zeroes;

transform the contents of the first portion and second portion of the input buffer to frequency domain components by a frequency domain transformation engine;

multiply the transformed frequency domain components with a first filter coefficients indicative of a short echo to generate frequency domain components with short echo effect by a filter coefficient multiplier;

multiply the transformed frequency domain components with a second filter coefficients indicative of a long echo to generate frequency domain components with long echo effect by the filter coefficient multiplier;

convert the frequency domain components with short echo effect to a time domain components with short echo effect by a time domain transformation engine;

converting the frequency domain components with long echo effect to a time domain components with long echo effect by the time domain transformation engine; and combine selective time domain components with short echo effect and selective time domain components with long echo effect by an overlap adder engine to generate a convolved first channel output and a convolved second channel output.

9. The system of claim 8, wherein the first filter coefficients and the second filter coefficients are generated based on a predefined space, and the convolved first channel output and the convolved second channel output represent the effect of the predefined space on the received audio signals for the first channel and the second channel.

10. The system of claim 8, further including:

generate a convolved first channel analog audio signal based on the convolved first channel output;

generate a convolved second channel analog audio signal based on the convolved second channel output; and and feed the convolved analog first channel analog audio signal and the convolved second channel analog audio signal to the audio reproduction device.

11. The system of claim 8, wherein the frequency domain transformation engine includes y decimation in frequency steps, where $x=2^p$ and $y=p+1$.

12. The system of claim 8, wherein the generated convolved first channel output and convolved second channel output further includes selective combination of time domain components from a current time period and a previous time period.

13. The system of claim 8, further including, adding a CH distortion to the convolved first channel output and the convolved second channel output.

14. The system of claim 10, wherein a correction to the convolved first channel output and the convolved second channel output is added with mid side modification based on a middle-side filter, before the analog audio signal is generated.

* * * * *